(12) United States Patent
Yoshida et al.

(10) Patent No.: US 11,852,933 B2
(45) Date of Patent: Dec. 26, 2023

(54) LIQUID CRYSTAL DISPLAY DEVICE

(71) Applicant: Sharp Display Technology Corporation, Kameyama (JP)

(72) Inventors: Takehisa Yoshida, Kameyama (JP); Fumikazu Shimoshikiryoh, Kameyama (JP); Shigeyuki Yamada, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/867,734

(22) Filed: Jul. 19, 2022

(65) Prior Publication Data

US 2023/0037436 A1    Feb. 9, 2023

(30) Foreign Application Priority Data

Jul. 20, 2021   (JP) .................. 2021-120056

(51) Int. Cl.
*G02F 1/1362*     (2006.01)
(52) U.S. Cl.
CPC .. *G02F 1/136222* (2021.01); *G02F 1/136286* (2013.01)
(58) Field of Classification Search
CPC ......... G02F 1/136222; G02F 1/136286; G02F 1/133601
See application file for complete search history.

(56) References Cited

U.S. PATENT DOCUMENTS

| 2003/0098837 | A1  | 5/2003  | Iwamoto et al. |
| 2009/0147186 | A1  | 6/2009  | Nakai et al. |
| 2018/0341132 | A1* | 11/2018 | Suzuki ............. G02F 1/1347 |
| 2019/0147812 | A1  | 5/2019  | Koudo et al. |
| 2019/0302516 | A1  | 10/2019 | Chen |

FOREIGN PATENT DOCUMENTS

| JP | 2002-99250 A   | 4/2002 |
| JP | 2003-162265 A  | 6/2003 |
| JP | 2008-191269 A  | 8/2008 |
| JP | 2011-76107 A   | 4/2011 |
| WO | 2008/053724 A1 | 5/2008 |
| WO | 2018/011831 A1 | 1/2018 |

* cited by examiner

*Primary Examiner* — James A Dudek
(74) *Attorney, Agent, or Firm* — Keating & Bennett, LLP

(57) ABSTRACT

A liquid crystal display device includes a display region, and includes a first liquid crystal panel including a color filter layer, an illumination device provided on a back face side of the first liquid crystal panel, and a second liquid crystal panel arranged between the first liquid crystal panel and the illumination device and not including a color filter layer. The second liquid crystal panel includes a first dimming region defined by a plurality of pixels arranged in a matrix including a plurality of rows and a plurality of columns and facing the display region, and a second dimming region that is defined by a plurality of additional pixels each including an unshaded opening region, and is located outside the first dimming region.

21 Claims, 31 Drawing Sheets

Pvr

| | 10 INCH 4K | 31.5 INCH 4K | 60 INCH 4K | 10 INCH FHD | 31.5 INCH FHD | 60 INCH FHD |
|---|---|---|---|---|---|---|
| ● 30°, 15° | 7 | 2 | 2 | 4 | 1 | 1 |
| □ 40°, 25° | 10 | 3 | 2 | 5 | 2 | 1 |
| ▲ 50°, 35° | 13 | 4 | 3 | 7 | 2 | 2 |
| ◇ 60°, 45° | 16 | 5 | 3 | 8 | 3 | 2 |
| ○ 70°, 55° | 19 | 6 | 4 | 10 | 3 | 2 |

FIG. 10G

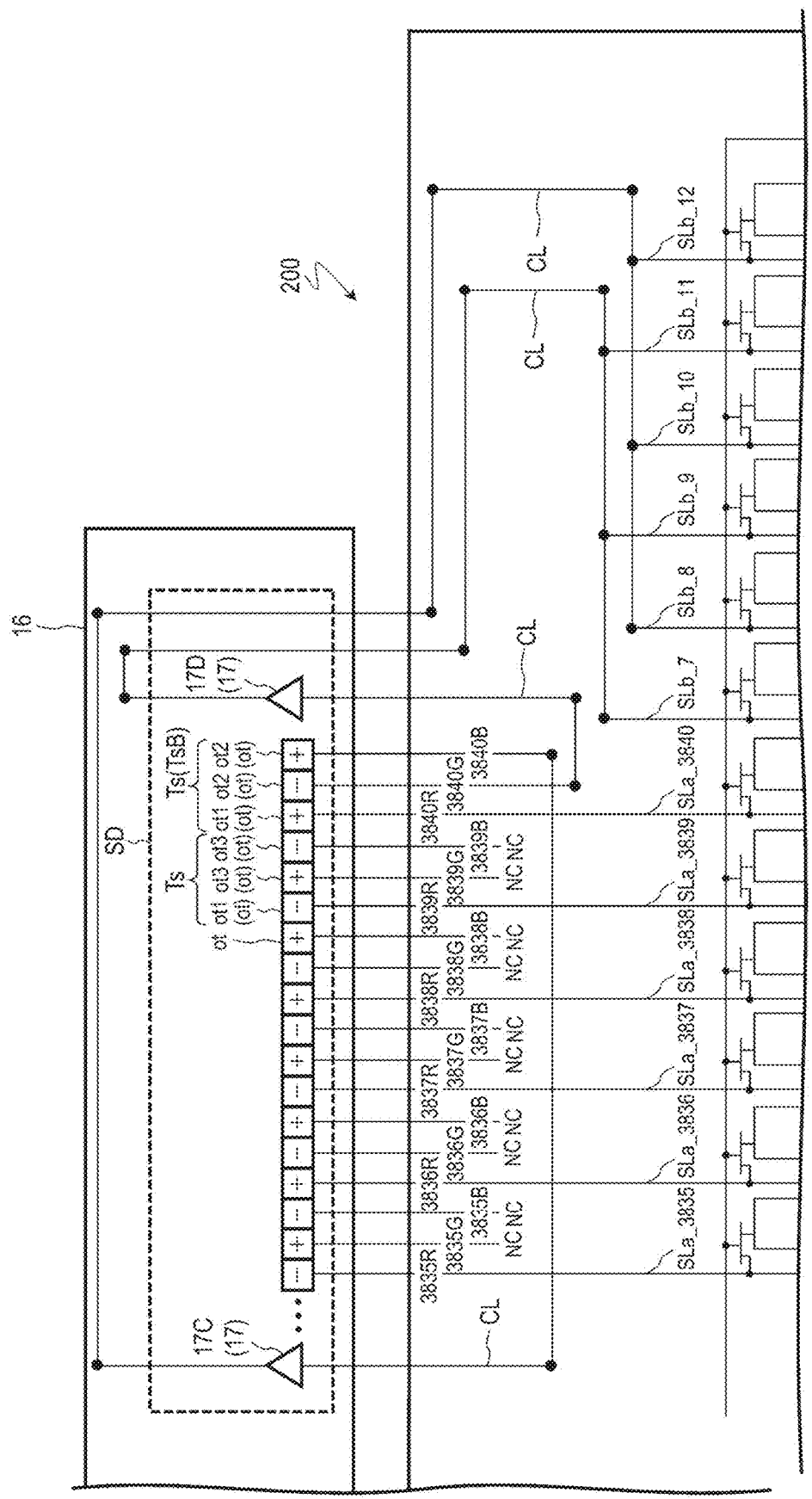

LIQUID CRYSTAL DISPLAY DEVICE

CROSS-REFERENCE TO RELATED APPLICATIONS

This application claims the benefit of priority to Japanese Patent Application Number 2021-120056 filed on Jul. 20, 2021. The entire contents of the above-identified application are hereby incorporated by reference.

BACKGROUND

Technical Field

The disclosure relates to a liquid crystal display device.

As a technique for greatly improving the contrast ratio of the liquid crystal display device, a technique for dividing the backlight into a plurality of areas and controlling the luminance for each area (called as "division drive", "area drive", or "local dimming") is known. The division drive of the backlight is disclosed in, for example, JP 2002-99250 A.

In a case of the division drive of the backlight, a large luminance difference between adjacent areas may cause white bleeding on the display screen. This phenomenon is called a "halo" and can cause deterioration of display quality.

In order to solve this problem, as a technique that can greatly improve the contrast ratio without causing a halo, in WO 2008/053724, a liquid crystal display device having a configuration in which two liquid crystal display panels are layered (hereinafter, referred to as "dual cell structure") is proposed.

SUMMARY

In a liquid crystal display device having the dual cell structure, when the display screen is observed from an oblique direction, images may not be properly displayed at edges of screen ("image lacking").

Embodiments of the disclosure have been made in view of the above problem, and an object of the disclosure is to provide a liquid crystal display device having a dual cell structure that prevents image lacking when observed from an oblique direction.

According to the embodiments of the disclosure, there are provided solutions according to the following items.

Item 1

A liquid crystal display device includes a first liquid crystal panel including a display region and including a color filter layer, an illumination device provided on a back face side of the first liquid crystal panel, and a second liquid crystal panel arranged between the first liquid crystal panel and the illumination device and not including a color filter layer, in which the second liquid crystal panel includes a first dimming region defined by a plurality of pixels arranged in a matrix including a plurality of rows and a plurality of columns and facing the display region, and a second dimming region defined by a plurality of additional pixels each including an unshaded opening region and located outside the first dimming region.

Item 2

The liquid crystal display device according to item 1, in which the second liquid crystal panel includes a plurality of gate wiring lines extending in a row direction and a plurality of source wiring lines extending in a column direction.

Item 3

The liquid crystal display device according to item 2, in which the second dimming region includes a first portion and a second portion that extend in the column direction and are arranged sandwiching the first dimming region in the row direction.

Item 4

The liquid crystal display device according to item 3, further includes a source wiring line drive circuit configured to supply source signals to the plurality of source wiring lines, in which the plurality of source wiring lines include a plurality of first source wiring lines provided corresponding to the plurality of pixels and a plurality of second source wiring lines provided corresponding to additional pixels located in the first portion and the second portion of the second dimming region among the plurality of additional pixels, the source wiring line drive circuit includes a plurality of source output terminals each configured to output a source signal and outnumbering the plurality of source wiring lines, and the plurality of source output terminals include a plurality of first source output terminals electrically connected to the plurality of first source wiring lines, a plurality of second source output terminals electrically connected to the plurality of second source wiring lines, and a plurality of third source output terminals not electrically connected to either the plurality of first source wiring lines or the plurality of second source wiring lines.

Item 5

The liquid crystal display device according to item 4, in which in a case that the number of the plurality of first source wiring lines is n, the number of the plurality of source output terminals is 3n.

Item 6

The liquid crystal display device according to item 4 or 5, in which the source wiring line drive circuit includes a plurality of terminal sets, each of the plurality of terminal sets including three source output terminals that are arranged consecutively among the plurality of source output terminals and are configured to output source signals having the same gray scale.

Item 7

The liquid crystal display device according to item 6, in which one of the three source output terminals is one of the plurality of first source output terminals.

Item 8

The liquid crystal display device according to item 7, in which, in a case that, among a plurality of pixel columns configured by the plurality of pixels, a pixel column adjacent to the first portion of the second dimming region is referred to as a first endmost pixel column and a pixel column adjacent to the second portion of the second dimming region is referred to as a second endmost pixel column, and in a case that, among the plurality of terminal sets, a terminal set including a first source output terminal electrically connected to a first source wiring line provided corresponding to the first endmost pixel column is referred to as a first endmost terminal set and a terminal set including a first source output terminal electrically connected to a first source wiring line provided corresponding to the second endmost pixel column is referred to as a second endmost terminal set, one or two of the three source output terminals of each of the first endmost terminal set and the second endmost terminal set are the second source output terminal.

Item 9

The liquid crystal display device according to item 8, in which two of the three source output terminals included in each of a plurality of terminal sets other than the first endmost terminal set and the second endmost terminal set among the plurality of terminal sets are the third source output terminal.

Item 10

The liquid crystal display device according to item 8 or 9, in which the plurality of source output terminals are arranged such that a source output terminal configured to output a source signal having a first polarity in a horizontal scanning period and a source output terminal configured to output a source signal having a second polarity opposite to the first polarity in the horizontal scanning period are alternately arranged along the row direction, and the plurality of source wiring lines are electrically connected to some of the plurality of source output terminals such that the second liquid crystal panel is driven by source inversion or dot inversion.

Item 11

The liquid crystal display device according to item 10, in which among the plurality of additional pixels, additional pixels located in each of the first portion and second portion are arranged in a plurality of columns, the plurality of second source wiring lines include two or more second source wiring lines provided in the first portion and two or more second source wiring lines provided in the second portion, two of the three source output terminals included in each of the first endmost terminal set and the second endmost terminal set are two second source output terminals configured to output source signals having opposite polarities to each other, some of the two or more second source wiring lines provided in the first portion are electrically connected to one of the two second source output terminals of the first endmost terminal set, and remaining one or more second source wiring lines are electrically connected to another of the two second source output terminals of the first endmost terminal set, and some of the two or more second source wiring lines provided in the second portion are electrically connected to one of the two second source output terminals of the second endmost terminal set, and remaining one or more second source wiring lines are electrically connected to another of the two second source output terminals of the second endmost terminal set.

Item 12

The liquid crystal display device according to any one of items 4 to 11, further includes a plurality of buffer amplifiers, in which each of the plurality of second source output terminals is electrically connected to a corresponding second source wiring line via at least one buffer amplifier among the plurality of buffer amplifiers.

Item 13

The liquid crystal display device according to item 12, in which each of the plurality of second source output terminals is electrically connected to a corresponding second source wiring line via two or more buffer amplifiers among the plurality of buffer amplifiers.

Item 14

The liquid crystal display device according to item 12 or 13, in which the source wiring line drive circuit includes the plurality of buffer amplifiers.

Item 15

The liquid crystal display device according to any one of items 12 to 14, in which the second liquid crystal panel includes a connection wiring line electrically connecting each of the plurality of second source output terminals to a corresponding second source wiring line via the at least one buffer amplifier.

Item 16

The liquid crystal display device according to any one of items 3 to 15, in which the plurality of additional pixels include a plurality of first additional pixels located in the first portion of the second dimming region and a plurality of second additional pixels located in the second portion of the second dimming region, in a case that, among a plurality of pixel columns constituted of the plurality of pixels, a pixel column adjacent to the first portion of the second dimming region is referred to as a first endmost pixel column, and a pixel column adjacent to the second portion of the second dimming region is referred to as a second endmost pixel column, each of the plurality of first additional pixels exhibits substantially the same luminance as a pixel in the same row of the first endmost pixel column, and each of the plurality of second additional pixels exhibits substantially the same luminance as a pixel in the same row of the second endmost pixel column.

Item 17

The liquid crystal display device according to any one of items 3 to 16, in which a width Whr in the row direction of each of the first portion and the second portion of the second dimming region is 2 mm or less.

Item 18

The liquid crystal display device according to any one of items 3 to 17, in which the number Phr of additional pixel columns in each of the first portion and the second portion of the second dimming region is 25 or less.

Item 19

The liquid crystal display device according to any one of items 2 to 18, in which the second dimming region includes a third portion and a fourth portion that extend in the row direction and are arranged sandwiching the first dimming region in the column direction.

Item 20

The liquid crystal display device according to item 19, in which the plurality of gate wiring lines include a plurality of first gate wiring lines provided corresponding to the plurality of pixels, at least one second gate wiring line provided corresponding to additional pixels located in the third portion of the second dimming region among the plurality of additional pixels, and at least one third gate wiring line provided corresponding to additional pixels located in the fourth portion of the second dimming region among the plurality of additional pixels, the at least one second gate wiring line is electrically connected to a first gate wiring line provided corresponding to a pixel row adjacent to the third portion of the second dimming region among the plurality of first gate wiring lines, and the at least one third gate wiring line is electrically connected to a first gate wiring line provided corresponding to a pixel row adjacent to the fourth portion of the second dimming region among the plurality of first gate wiring lines.

Item 21

The liquid crystal display device according to item 19 or 20, in which the plurality of additional pixels include a plurality of third additional pixels located in the third portion of the second dimming region and a plurality of fourth additional pixels located in the fourth portion of the second dimming region, in a case that, among a plurality of pixel rows constituted of the plurality of pixels, a pixel row adjacent to the third portion of the second dimming region is referred to as a first endmost pixel row, and a pixel row adjacent to the fourth portion of the second dimming region is referred to as a second endmost pixel row, each of the plurality of third additional pixels exhibits substantially the same luminance as a pixel in the same column of the first endmost pixel row, and each of the plurality of fourth additional pixels exhibits substantially the same luminance as a pixel in the same column of the second endmost pixel row.

Item 22

The liquid crystal display device according to any one of items 19 to 21, in which a width Wvr in the column direction of each of the third portion and the fourth portion of the second dimming region is 2 mm or less.

Item 23

The liquid crystal display device according to any one of items 19 to 22, in which the number Pvr of additional pixel rows in each of the third portion and the fourth portion of the second dimming region is 25 or less.

Item 24

The liquid crystal display device according to any one of items 1 to 23, in which the first dimming region has a substantially rectangular shape, and the second dimming region has a frame-like shape surrounding the first dimming region.

Item 25

The liquid crystal display device according to item 2, in which the second dimming region includes a first portion and a second portion that extend in the column direction and are arranged sandwiching the first dimming region in the row direction, and a third portion and a fourth portion that extend in the row direction and are arranged sandwiching the first dimming region in the column direction.

Item 26

The liquid crystal display device according to item 25, in which a width Whr in the row direction of each of the first portion and the second portion of the second dimming region, and a width Wvr in the column direction of each of the third portion and the fourth portion of the second dimming region, satisfy a relationship of Whr/Wvr≤2.

Item 27

The liquid crystal display device according to item 25 or 26, in which the number Phr of additional pixel columns in each of the first portion and the second portion of the second dimming region, and the number Pvr of additional pixel rows in each of the third portion and the fourth portion of the second dimming region, satisfy a relationship of Phr/Pvr≤2.

Item 28

The liquid crystal display device according to any one of items 1 to 27, in which display is performed in a transverse electrical field mode.

According to the embodiments of the disclosure, it is possible to provide a liquid crystal display device having a dual cell structure that prevents image lacking when observed from an oblique direction.

BRIEF DESCRIPTION OF DRAWINGS

The disclosure will be described with reference to the accompanying drawings, wherein like numbers reference like elements.

FIG. 10G is a graph showing results of trial calculation of the number Pvr of additional pixel rows in each of the upper side additional region CR2c and the lower side additional region CR2d.

FIG. 11B is a diagram illustrating the rightmost source driver SD among the plurality of source drivers SD of the liquid crystal display device 1000 and the vicinity of the rightmost source driver SD.

DESCRIPTION OF EMBODIMENTS

Hereinafter, embodiments of the disclosure will be described with reference to the accompanying drawings. The embodiments of the disclosure are not limited to configurations exemplified below.

Figure 1:
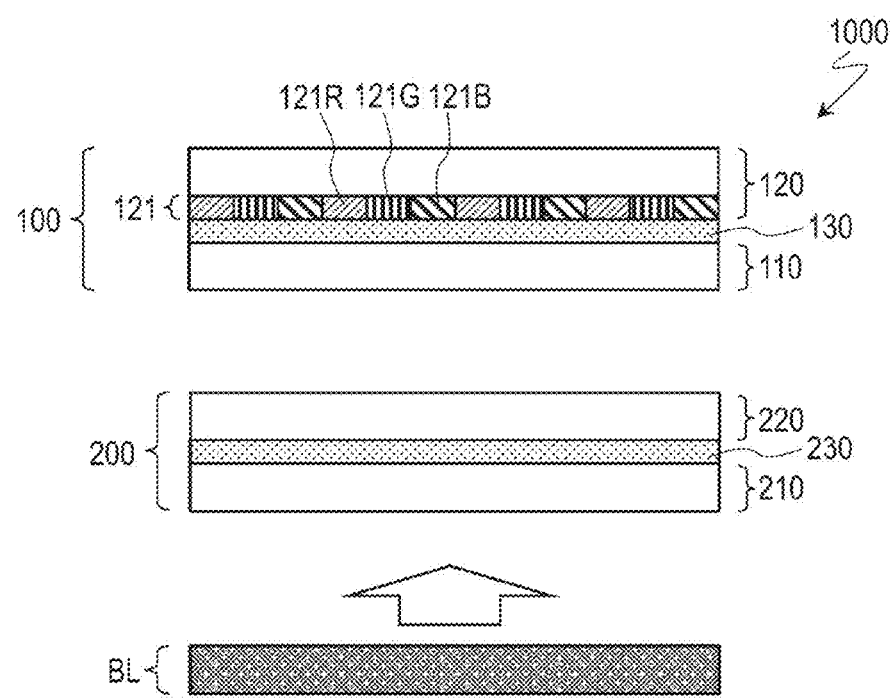
FIG. 1 is a cross-sectional view schematically illustrating a liquid crystal display device 1000 according to an embodiment of the disclosure.

A liquid crystal display device 1000 according to an embodiment of the disclosure will be described with reference to FIG. 1. FIG. 1 is a cross-sectional view schematically illustrating the liquid crystal display device 1000.

As illustrated in FIG. 1, the liquid crystal display device 1000 includes a first liquid crystal panel (hereinafter referred to as "front panel") 100, a backlight (illumination device) BL provided on a back face side of the front panel 100 (opposite to an observer side), and a second liquid crystal panel (hereinafter referred to as "rear panel") 200 arranged between the front panel 100 and the backlight BL. The liquid crystal display device 1000 displays in a transverse electrical field mode, more specifically, in a fringe field switching (FFS) mode.

The front panel 100 includes a TFT substrate (active matrix substrate) 110, a counter substrate (color filter substrate) 120 facing the TFT substrate 110, and a liquid crystal layer 130 provided between the TFT substrate 110 and the counter substrate 120. A color filter layer 121 is provided on the counter substrate 120 of the front panel 100. The color filter layer 121 includes a red color filter 121R, a green color filter 121G, and a blue color filter 121B. A thickness of the liquid crystal layer 130 is defined by, for example, a plurality of columnar spacers (not illustrated).

The rear panel 200 includes a TFT substrate (active matrix substrate) 210, a counter substrate 220 facing the TFT substrate 210, and a liquid crystal layer 230 provided between the TFT substrate 210 and the counter substrate 220. The counter substrate 220 of the rear panel 200 is not provided with a color filter layer. That is, the rear panel 200 does not include a color filter layer. A thickness of the liquid crystal layer 230 is defined by, for example, a plurality of columnar spacers (not illustrated).

The backlight BL includes a light source (not illustrated) and illuminates the rear panel 200. The backlight BL may be an edge-lit type or a back-lit type. The edge-lit backlight BL includes a light guide plate in addition to the light source.

The front panel 100 is a color liquid crystal panel for display capable of displaying a color image. In contrast, the rear panel 200 is a grayscale liquid crystal panel for dimming that adjusts an amount of light incident on the front panel 100 for each region (for each pixel described later).

Figure 2:
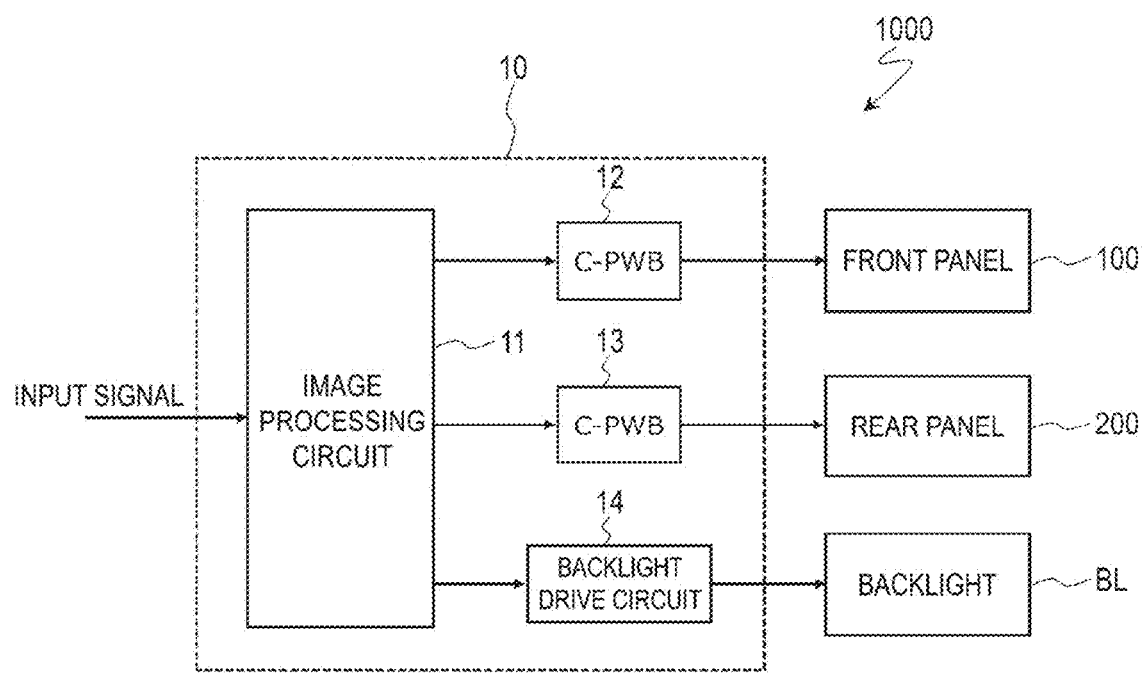
FIG. 2 is a block diagram illustrating an overall configuration of the liquid crystal display device 1000.

FIG. 2 is a block diagram illustrating an overall configuration of the liquid crystal display device 1000. As illustrated in FIG. 2, the liquid crystal display device 1000 further includes a system circuit 10 that controls the front panel 100, the rear panel 200, and the backlight BL.

In the example illustrated in FIG. 2, the system circuit 10 includes an image processing circuit 11 that performs predetermined signal processing on an input image signal (input signal), a controller substrate (C-PWB) 12 for driving the front panel 100, a controller substrate (C-PWB) 13 for driving the rear panel 200, and a backlight drive circuit 14 for driving the backlight BL.

Figure 3:
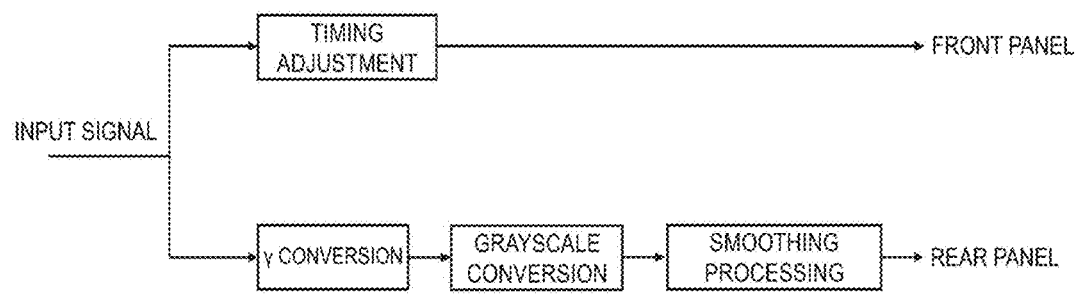
FIG. 3 is a block diagram for explaining signal processing for an input signal in the liquid crystal display device 1000.

FIG. 3 is a block diagram for explaining signal processing for an input signal. Here, the input signal is a digital RGB signal. As illustrated in FIG. 3, the timing-adjusted input signal is output to the front panel 100. In contrast, the input signal is subjected to γ conversion and grayscale conversion and output to the rear panel 200.

The γ conversion is performed to get a γ value of the output signal to a desired value. The γ conversion can be performed, for example, with reference to a look-up table (LUT). The grayscale conversion is processing in which the maximum value among the gray scale values of R, G, and B indicated by the RGB signal is set as a gray scale value for each pixel.

As illustrated in FIG. 3, smoothing processing may be performed after the grayscale conversion. The smoothing processing is processing of bleeding the dimming pattern (which can also be referred to as "monochrome display") by the rear panel 200. The smoothing processing can prevent deterioration of display quality due to parallax caused when the front panel 100 and the rear panel 200 are overlapped with each other. The smoothing processing is disclosed in, for example, JP 2008-191269 A and JP 2011-76107 A. The disclosure contents of JP 2008-191269 A and JP 2011-76107 A are incorporated herein by reference.

Figure 4:
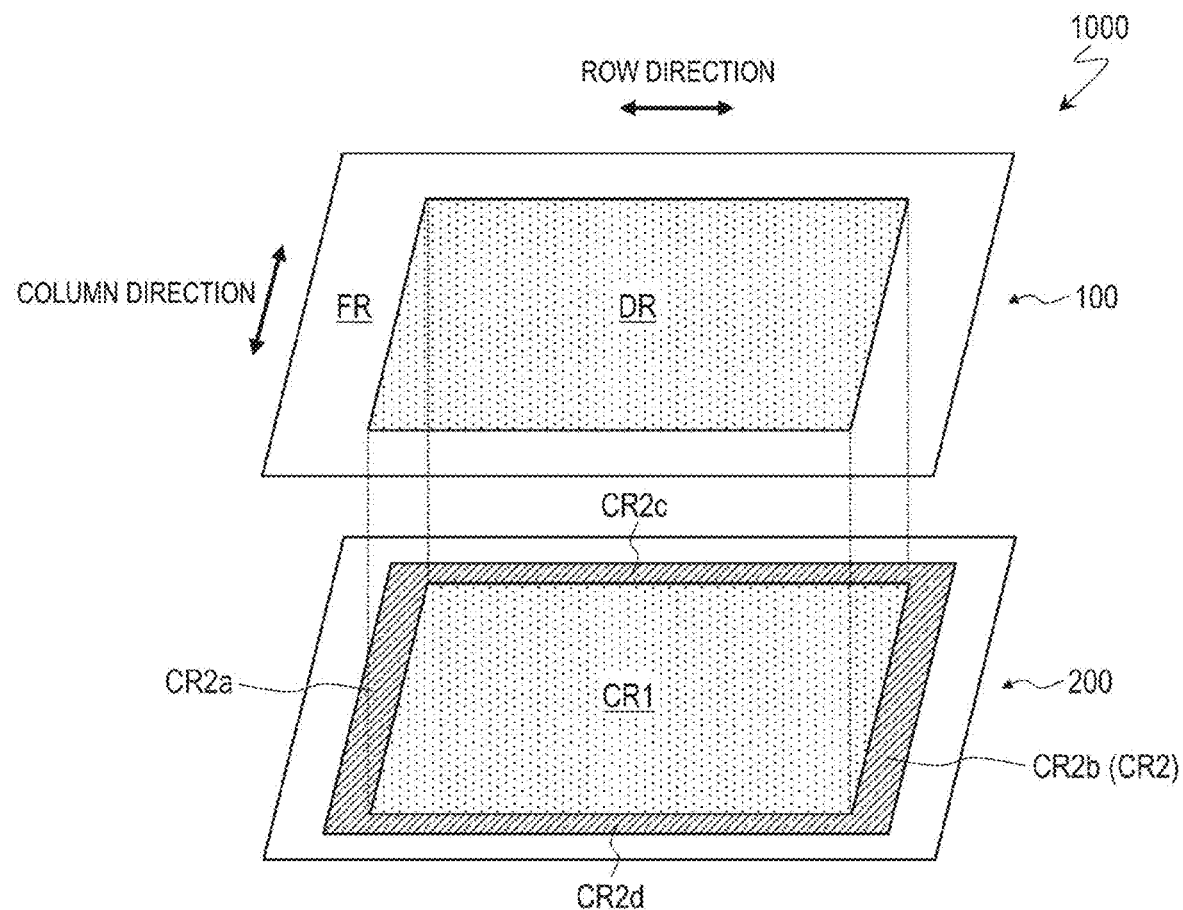
FIG. 4 is a diagram for explaining regions provided on a front panel 100 and a rear panel 200 of the liquid crystal display device 1000.

FIG. 4 is a diagram for explaining regions provided on the front panel 100 and the rear panel 200.

As illustrated in FIG. 4, the front panel 100 has a display region DR and a peripheral region (frame region) FR. The display region DR is defined by a plurality of pixels arranged in a matrix including a plurality of rows and a plurality of columns. The plurality of pixels include red pixels that display red, green pixels that display green, and blue pixels that display blue. One color display pixel is composed of three pixels, the red pixel, the green pixel, and the blue pixel. Although not illustrated here, each pixel has an electrode structure for the FFS mode. The peripheral region FR is located around the display region DR. In the embodiment, the resolution of the front panel 100 is 4K (3840×2160).

The rear panel 200 has a first dimming region CR1 and a second dimming region CR2. The first dimming region CR1 faces the display region DR of the front panel 100. Here, "the first dimming region CR1 faces the display region DR" means that the first dimming region CR1 at least partially overlaps the display region DR when viewed from a normal direction of the display surface. It is not always necessary that the first dimming region CR1 exactly overlaps the display region DR. Misalignments due to lamination errors and slight differences in size between the first dimming region CR1 and the display region DR are acceptable. The second dimming region CR2 is located outside the first dimming region CR1.

In the example illustrated in FIG. 4, the first dimming region CR1 has a substantially rectangular shape. In contrast, the second dimming region CR2 has a frame-like shape surrounding the first dimming region CR1, and includes a first portion CR2*a* and a second portion CR2*b* extending in a column direction, and a third portion CR2*c* and a fourth portion CR2*d* extending in a row direction. The first portion CR2*a* and the second portion CR2*b* are arranged so as to sandwich the first dimming region CR1 in the row direction. The third portion CR2*c* and the fourth portion CR2*d* are arranged so as to sandwich the first dimming region CR1 in the column direction. Hereinafter, the first dimming region CR1 may be referred to as a "normal dimming region" and the second dimming region CR2 may be referred to as an "additional dimming region". Further, the first portion CR2*a*, the second portion CR2*b*, the third portion CR2*c*, and the fourth portion CR2*d* of the second dimming region CR2 may be referred to as a "left side additional region", "right side additional region", "upper side additional region", and "lower side additional region", respectively.

Figure 5:
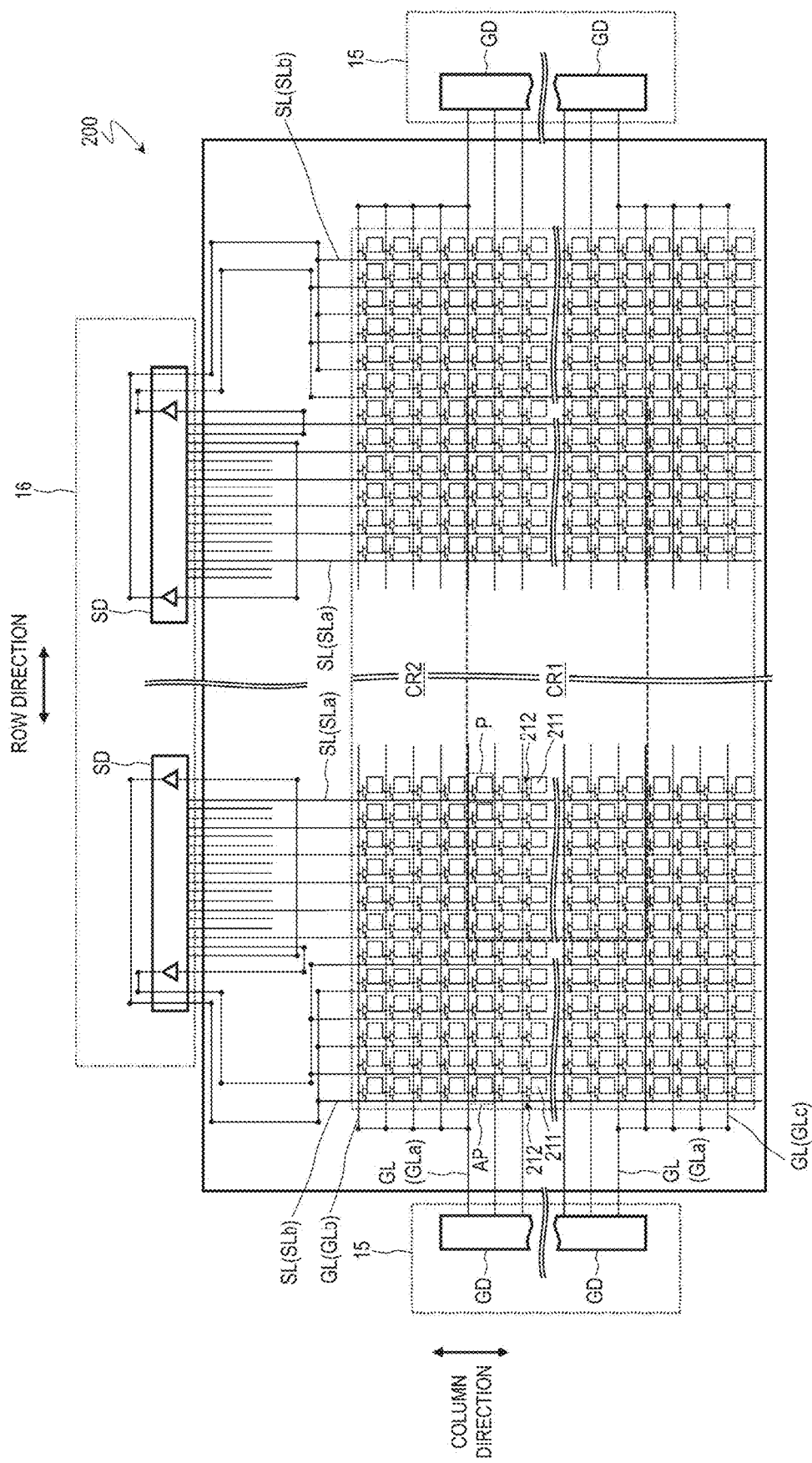
FIG. 5 is a plan view schematically illustrating the rear panel 200.

With reference to FIG. 5, the first dimming region CR1 and the second dimming region CR2 of the rear panel 200 will be described more specifically. FIG. 5 is a plan view schematically illustrating the rear panel 200.

As illustrated in FIG. 5, the first dimming region (normal dimming region) CR1 is defined by a plurality of pixels P arranged in a matrix including a plurality of rows and a plurality of columns. Each pixel P is provided with a pixel electrode 211 and a thin film transistor (TFT) 212 electrically connected to the pixel electrode 211. In the embodiment, a resolution of the first dimming region CR1 of the rear panel 200 is 4K (3840×2160), and a size of one pixel P of the rear panel 200 is substantially the same as a size of one color display pixel of the front panel 100.

The second dimming region (additional dimming region) CR2 is defined by a plurality of additional pixels AP. Similar to the pixel P, each additional pixel AP is provided with the pixel electrode 211 and the TFT 212. Among the plurality of additional pixels AP, additional pixels AP located in each of the left side additional region (first portion) CR2*a* and the right side additional region (second portion) CR2*b* are arranged in a plurality of columns (here, six columns). Further, additional pixels AP located in each of the upper side additional region (third portion) CR2*c* and the lower side additional region (fourth portion) CR2*d* are arranged in a plurality of rows (here, four rows).

Although not illustrated here, the plurality of pixels P and the plurality of additional pixels AP have electrode structures for the FFS mode, respectively. In other words, in addition to the pixel electrode 211, the TFT substrate 210 is provided with a common electrode facing the pixel electrode 211 with an insulating layer interposed therebetween, and one of the pixel electrode 211 and the common electrode (the one closer to the liquid crystal layer 230) has at least one slit.

The rear panel 200 includes a plurality of gate wiring lines GL extending in the row direction and a plurality of source wiring lines SL extending in the column direction. Each gate wiring line GL applies a gate signal to the corresponding TFT 212. Each source wiring line SL applies a source signal to the corresponding TFT 212.

The plurality of gate wiring lines GL include a plurality of first gate wiring lines GLa provided corresponding to the plurality of pixels P, at least one (four here) second gate wiring line GLb provided corresponding to the additional pixels AP located in the upper side additional region CR2*c*, and at least one (four here) third gate wiring line GLc provided corresponding to the additional pixels AP located in the lower side additional region CR2*d*. Hereinafter, the first gate wiring line GLa may be referred to as a "normal gate wiring line" and the second gate wiring line GLb and the third gate wiring line GLc may be referred to as an "additional gate wiring line".

The plurality of source wiring lines SL include a plurality of first source wiring lines SLa provided corresponding to the plurality of pixels P, and a plurality of second source wiring lines SLb provided corresponding to the additional pixels AP located in the left side additional region CR2*a* and the right side additional region CR2*b*. Hereinafter, the first source wiring line SLa may be referred to as a "normal source wiring line" and the second source wiring line SLb may be referred to as an "additional source wiring line".

The liquid crystal display device 1000 includes a plurality of gate drivers GD that supply gate signals to the plurality of gate wiring lines GL of the rear panel 200, and a plurality of source drivers SD that supply source signals to the plurality of source wiring lines SL of the rear panel 200. In the description of the present application, the plurality of gate drivers GD are collectively referred to as a "gate wiring line drive circuit" (with reference numeral 15 in FIG. 5), and the plurality of source drivers SD are collectively referred to as a "source wiring line drive circuit" (with reference numeral 16 in FIG. 5). The rear panel 200 is driven by source inversion or dot inversion. The source inversion drive or the dot inversion drive suppresses the generation of flicker, thereby improving the display quality.

As already explained, the counter substrate 220 of the rear panel 200 is not provided with a color filter layer. However, the counter substrate 220 may be provided with a TFT light blocking layer arranged so as to overlap the TFT 212 and/or a spacer light blocking layer arranged so as to overlap the columnar spacer. By providing the TFT light blocking layer, it is possible to prevent deterioration of the TFT characteristics due to light, and by providing the spacer light blocking layer, it is possible to prevent a decrease in the contrast ratio caused by the columnar spacer.

Each pixel P includes a non-light blocking region (referred to as an "opening region"). Similarly, each additional pixel AP also includes an opening region. Thus, not only each pixel P but also each additional pixel AP has a dimming function (a function of adjusting an amount of transmitted light).

As described above, the liquid crystal display device 1000 of the embodiment includes the front panel 100 having the display region DR, and the rear panel 200 arranged between the front panel 100 and the backlight BL. That is, the liquid crystal display device 1000 has a dual cell structure. Thus, it is possible to display with a high contrast ratio, and suppress the generation of a halo.

Further, in the liquid crystal display device 1000 of the embodiment, the rear panel 200 has the second dimming region (additional dimming region) CR2 located outside the first dimming region (normal dimming region) CR1, thereby preventing image lacking when observed from the oblique direction. This point will be described below with reference to FIGS. 6A and 6B.

Figure 6A:
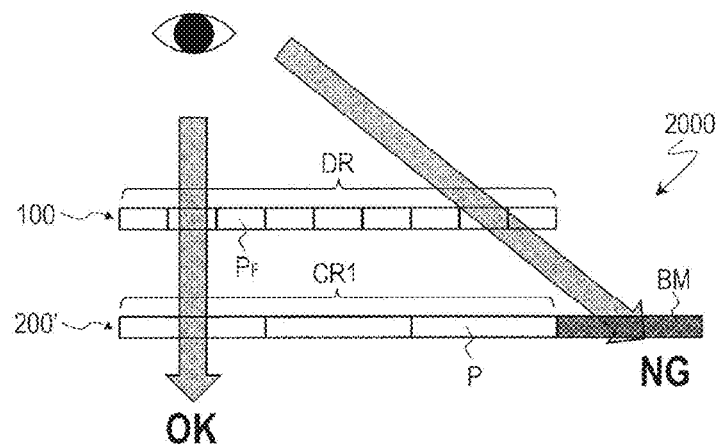
FIG. 6A is a diagram schematically illustrating image lacking in a liquid crystal display device 2000 according to a comparative example.

FIG. 6A is a diagram schematically illustrating image lacking in a liquid crystal display device 2000 according to a comparative example. The liquid crystal display device 2000 according to the comparative example differs from the liquid crystal display device 1000 in that a rear panel 200' does not have the second dimming region CR2. FIG. 6A illustrates a plurality of pixels $P_F$ that define the display region DR of the front panel 100. Further, in the configuration illustrated in FIG. 6A, a black matrix BM is provided around the first dimming region CR1 of the rear panel 200'.

In the liquid crystal display device 2000 according to the comparative example, no problem occurs when observing the pixel $P_F$ in the display region DR from a front direction (pixel $P_F$ is properly visible). However, when the pixel $P_F$ at the edge of the display region DR is observed from an oblique direction, the pixel $P_F$ does not overlap the pixel P of the rear panel 200' (overlaps the black matrix BM), so that the pixel $P_F$ may not be viewed properly.

Figure 6B:
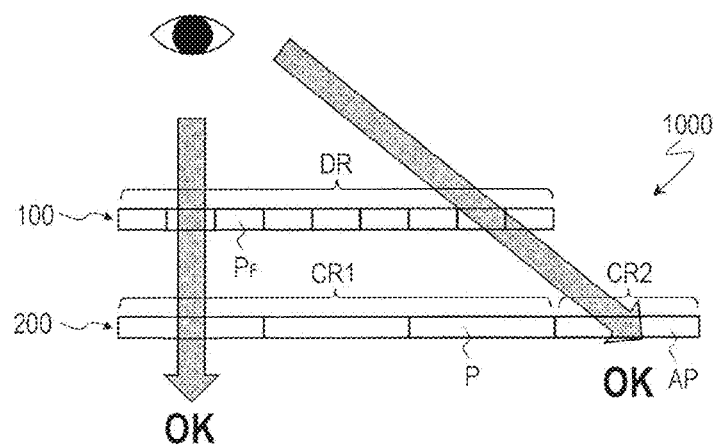
FIG. 6B is a diagram schematically illustrating how image lacking is prevented in the liquid crystal display device 1000.

FIG. 6B is a diagram schematically illustrating how image lacking is prevented in the liquid crystal display device 1000 according to the embodiment. In the liquid crystal display device 1000 according to the embodiment, when the pixel $P_F$ in the display region DR is observed from the front direction, no problem occurs (pixel $P_F$ is properly visible). Further, when the pixels $P_F$ at the edge of the display region DR is observed from the oblique direction, the pixel $P_F$ overlaps the additional pixel AP in the second dimming region CR2 of the rear panel 200, so no image lacking occurs.

In this manner, in the liquid crystal display device 1000 according to the embodiment of the disclosure, image lacking when observing from the oblique direction is prevented. However, when the additional pixels AP are provided (that is, the second dimming region CR2 is provided), signal input to the additional pixels AP is required. This may cause a new problem such as the inability to use peripheral circuits (a timing controller, a gate driver, a source driver, etc.) for the ordinary liquid crystal panel without modification, or the need to change input signal specifications (for example, when the resolution is 4K, an input signal of $(3840+\alpha) \times (2160+\alpha)$ is required for the rear panel).

By having a configuration described below, the liquid crystal display device 1000 according to the embodiment of the disclosure can use peripheral circuits for an ordinary liquid crystal panel or eliminate the need to change the input signal specifications. This point will be further described below with reference to FIGS. 7A, 7B, and 8.

Figure 7A:
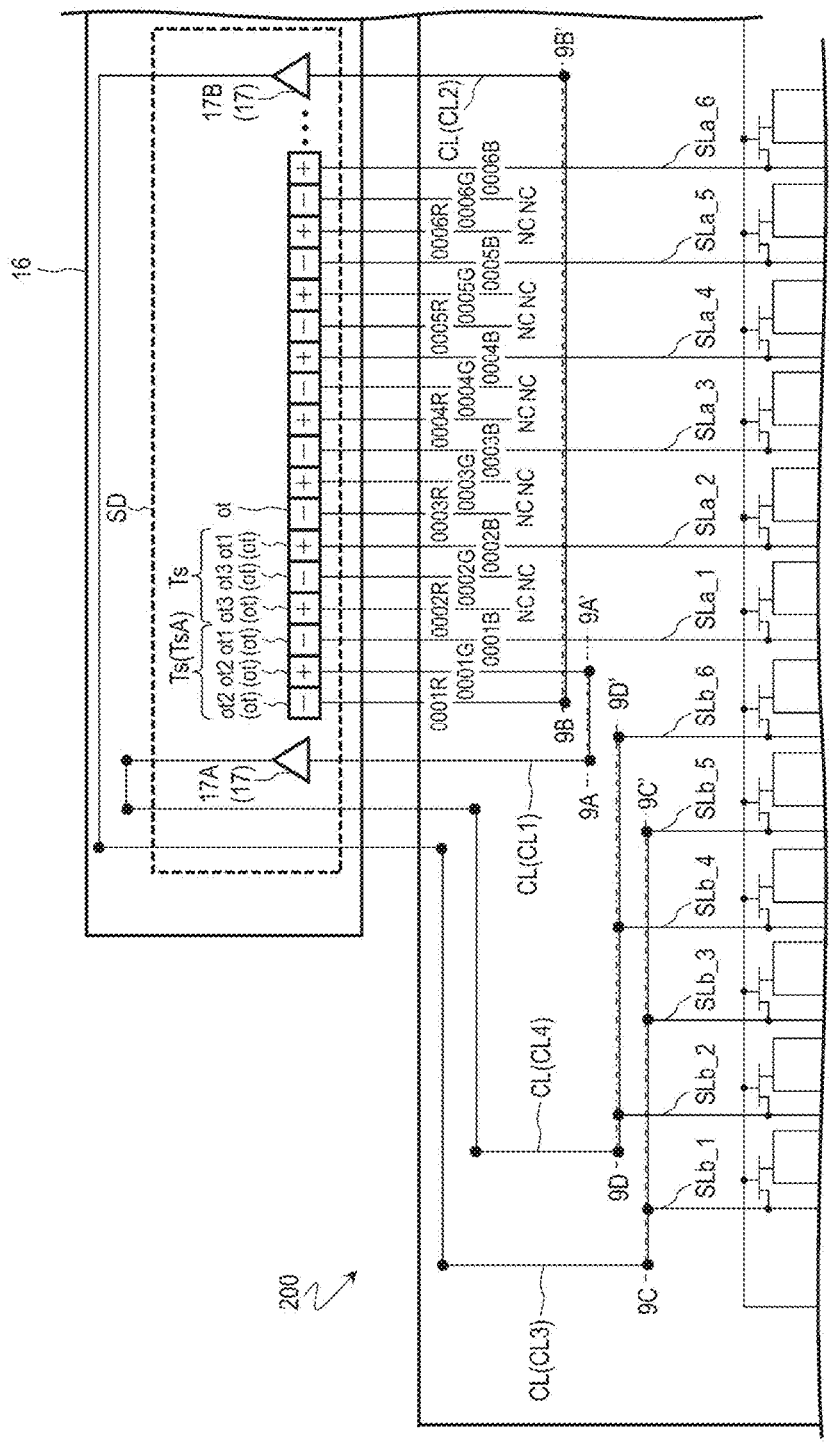
FIG. 7A is a diagram illustrating the leftmost source driver SD among a plurality of source drivers SD of the liquid crystal display device 1000 and the vicinity of the leftmost source driver SD.
Figure 7B:
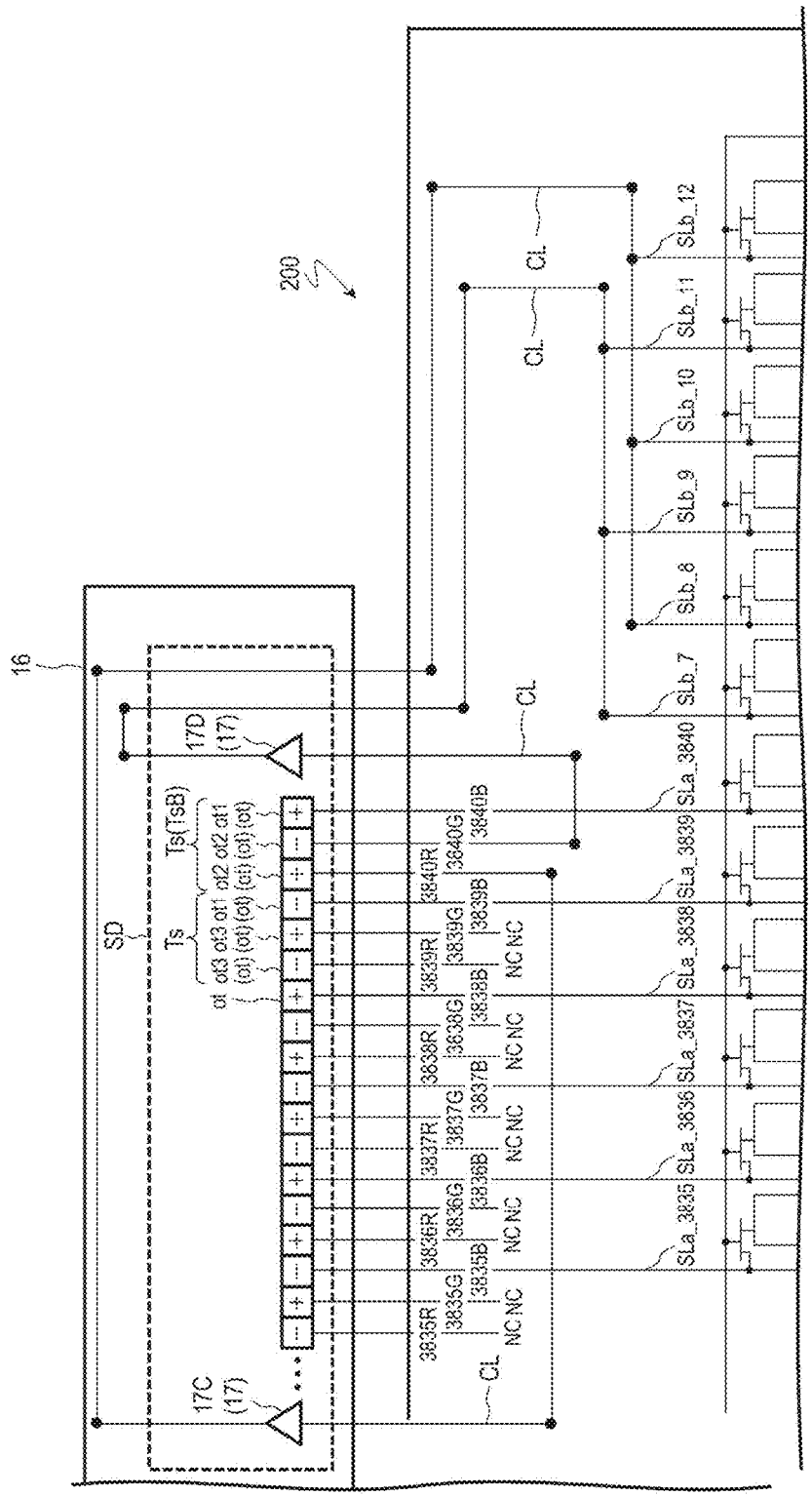
FIG. 7B is a diagram illustrating the rightmost source driver SD among the plurality of source drivers SD of the liquid crystal display device 1000 and the vicinity of the rightmost source driver SD.

FIG. 7A is a diagram illustrating the leftmost source driver SD among the plurality of source drivers SD and the vicinity of the leftmost source driver SD. FIG. 7B is a diagram illustrating the rightmost source driver SD among the plurality of source drivers SD and the vicinity of the rightmost source driver SD. In FIGS. 7A and 7B, a nth first source wiring line SLa from the left side among the plurality of first source wiring lines (normal source wiring lines) SLa is referred to as "SLa_n". Also, a nth second source wiring line SLb from the left side among the plurality of second source wiring lines (additional source wiring lines) SLb is referred to as "SLb_n". In FIG. 7A, the first to sixth first source wiring lines (normal source wiring lines) SLa_1 to SLa_6, and the first to sixth second source wiring lines (additional source wiring lines) SLb_1 to SLb_6 are illustrated. Also, in FIG. 7B, the 3835th to 3840th first source wiring lines (normal source wiring lines) SLa_3835 to SLa_3840, and the 7th to 12th second source wiring lines (additional source wiring lines) SLb_7 to SLb_12 are illustrated.

As illustrated in FIGS. 7A and 7B, the source wiring line drive circuit 16 (plurality of source drivers SD) has a plurality of source output terminals ot that output source signals. In the embodiment, the plurality of source output terminals ot outnumbers the plurality of source wiring lines SL. Specifically, when the number of the first source wiring lines (normal source wiring lines) SLa is n, the number of source output terminals ot is 3n.

The plurality of source output terminals ot are arranged so that source output terminals ot that output source signals having a first polarity in a horizontal scanning period (e.g., negative polarity) and source output terminals ot that output source signals having a second polarity (e.g., positive polarity) opposite to the first polarity in the horizontal scanning period are alternately located along the row direction.

Here, among the plurality of source output terminals ot included in the source wiring line drive circuit 16, a set of three source output terminals ot consecutively arranged is referred to as a "terminal set Ts". When the number of source output terminals ot is 3n, the number of terminal sets Ts is n (that is, source output terminals ot that constitute one terminal set Ts do not constitute another terminal set Ts).

In a source driver for an ordinary liquid crystal panel, each terminal set consists of a source output terminal that outputs a source signal to be supplied to the red pixel, a source output terminal that outputs a source signal to be supplied to the green pixel, and a source output terminal that outputs a source signal to be supplied to the blue pixel. Thus, in the description, the three source output terminals ot constituting each terminal set Ts may be referred to (described) as the source output terminals of the source driver for the ordinary liquid crystal panel. Specifically, the three source output terminals ot constituting each terminal set Ts may be referred to (described) as "red terminal", "green terminal", and "blue terminal" from the left side, and the red terminal, green terminal, and blue terminal of a nth terminal set Ts from the left side may be referred to (described) as "red terminal nR", "green terminal nG", and "blue terminal nB", respectively. For example, the three source output terminals ot constituting the first (i.e., the leftmost) terminal set Ts from the left side may be referred to (described) as "red terminal 0001R", "green terminal 0001G", and "blue terminal 0001B".

As already explained, in the embodiment, the input signal obtained by grayscale conversion is input to the rear panel 200. Thus, the three source output terminals (red terminal, green terminal, and blue terminal) ot constituting each terminal set Ts output source signals with the same gray scale.

Further, in the embodiment, the plurality of source output terminals ot include a plurality of first source output terminals ot1 electrically connected to the plurality of first source wiring lines (normal source wiring lines) SLa, a plurality of second source output terminals ot2 electrically connected to the plurality of second source wiring lines (additional source wiring lines) SLb, and a plurality of third source output terminals ot3 that are not electrically connected to either the first source wiring lines SLa or the second source wiring lines SLb (represented as "NC" in FIGS. 7A and 7B). In other words, the source output terminals ot are classified into three types according to the connection destination.

One of the three source output terminals ot constituting each terminal set Ts is electrically connected to the corresponding first source wiring line (normal source wiring line) SLa (i.e., the first source output terminal ot1). More specifically, the blue terminal of each terminal set Ts is the first source output terminal ot1, and the blue terminal nB of the nth terminal set Ts is electrically connected to the nth first source wiring line SLa_n.

Here, among the plurality of pixel columns composed of the plurality of pixels P, a pixel column adjacent to the left side additional region (first portion) CR2a is referred to as a "first endmost pixel column", and a pixel column adjacent to the right side additional region (second portion) CR2b is referred to as a "second endmost pixel column". Similarly, among the plurality of pixel rows composed of the plurality of pixels P, a pixel row adjacent to the upper side additional region (third portion) CR2c is referred to as a "first endmost pixel row" and a pixel row adjacent to the lower side additional region (fourth portion) CR2d is referred to as a "second endmost pixel row". Further, among the plurality of terminal sets Ts, a terminal set including the first source output terminal ot1 electrically connected to the first source wiring line SLa_1 corresponding to the first endmost pixel column is referred to as a "first endmost terminal set TsA", and a terminal set including the first source output terminal ot1 electrically connected to the first source wiring line SLa_3840 corresponding to the second endmost pixel column is referred to as a "second endmost terminal set TsB".

Two of the three source output terminals ot of the first endmost terminal set TsA are electrically connected to the second source wiring lines (additional source wiring lines) SLb of the left side additional region CR2a (i.e., the second source output terminals ot2). More specifically, the red terminal 0001R and the green terminal 0001G of the first endmost terminal set TsA are the second source output terminals ot2. The red terminal 0001R and the green terminal 0001G output source signals having opposite polarities to each other.

Further, two of the three source output terminals ot of the second endmost terminal set TsB are electrically connected to the second source wiring lines (additional source wiring lines) SLb of the right side additional region CR2b (i.e., the second source output terminals ot2). More specifically, the red terminal 3840R and the green terminal 3840G of the second endmost terminal set TsB are the second source output terminals ot2. The red terminal 3840R and the green terminal 3840G output source signals having opposite polarities to each other.

In the example illustrated in FIG. 5 and the like, the plurality of second source wiring lines SLb include six second source wiring lines SLb_1 to SLb_6 provided in the left side additional region CR2a and six second source wiring lines SLb_7 to SLb_12 provided in the right side additional region CR2b.

Some of the second source wiring lines SLb provided in the left side additional region CR2a, specifically, the first, third, and fifth second source wiring lines SLb_1, SLb_3, and SLb_5 are electrically connected to the red terminal 0001R of the first endmost terminal set TsA, and the remaining second source wiring lines SLb, specifically, the second, fourth, and sixth second source wiring lines SLb_2, SLb_4, and SLb_6, are electrically connected to the green terminal 0001G of the first endmost terminal set TsA.

Some of the second source wiring lines SLb provided in the right side additional region CR2b, specifically, the 7th, 9th, and 11th second source wiring lines SLb_7, SLb_9, and SLb_11 are electrically connected to the green terminal 3840G of the second endmost terminal set TsB, and the remaining second source wiring lines SLb, specifically, the 8th, 10th, and 12th second source wiring lines SLb_8, SLb_10, and SLb_12 are electrically connected to the red terminal 3840R of the second endmost terminal set TsB.

The red terminal and the green terminal of each terminal set Ts, other than the first endmost terminal set TsA and the second endmost terminal set TsB, are not electrically connected to either the first source wiring line SLa or the second source wiring line SLb (i.e., the third source output terminals ot3).

In this way, the plurality of source wiring lines SL are selectively connected to some of the plurality of source output terminals of so that the rear panel 200 is driven by source inversion or dot inversion.

In the illustrated example, the source wiring line drive circuit 16 (plurality of source drivers SD) includes a plurality of buffer amplifiers 17. The buffer amplifier 17, for example, may be originally provided for repairing breakage of the source wiring line SL. Each of the plurality of second source output terminals ot2, that is, the red terminal 0001R, the green terminal 0001G, the red terminal 3840R, and the green terminal 3840G, is electrically connected to the corresponding second source wiring lines SLb via one of the plurality of buffer amplifiers 17.

Specifically, of two buffer amplifiers 17A and 17B illustrated in FIG. 7A, the red terminal 0001R is electrically connected to the second source wiring lines SLb_1, SLb_3, and SLb_5 via one buffer amplifier 17B, and the green terminal 0001G is electrically connected to the second source wiring lines SLb_2, SLb_4, and SLb_6 via another buffer amplifier 17A. Also, of two buffer amplifiers 17C and 17D illustrated in FIG. 7B, the red terminal 3840R is electrically connected to the second source wiring lines SLb_8, SLb_10, and SLb_12 via one buffer amplifier 17C, and the green terminal 3840G is electrically connected to the second source wiring lines SLb_7, SLb_9, and SLb_11 via another buffer amplifier 17D.

The rear panel 200 includes connection wiring lines (in-panel wiring lines) CL for electrically connecting the second source output terminals ot2 to the corresponding second source wiring lines SLb via the buffer amplifiers 17, respectively. A specific structure of the connection wiring line CL will be described later.

Figure 8:
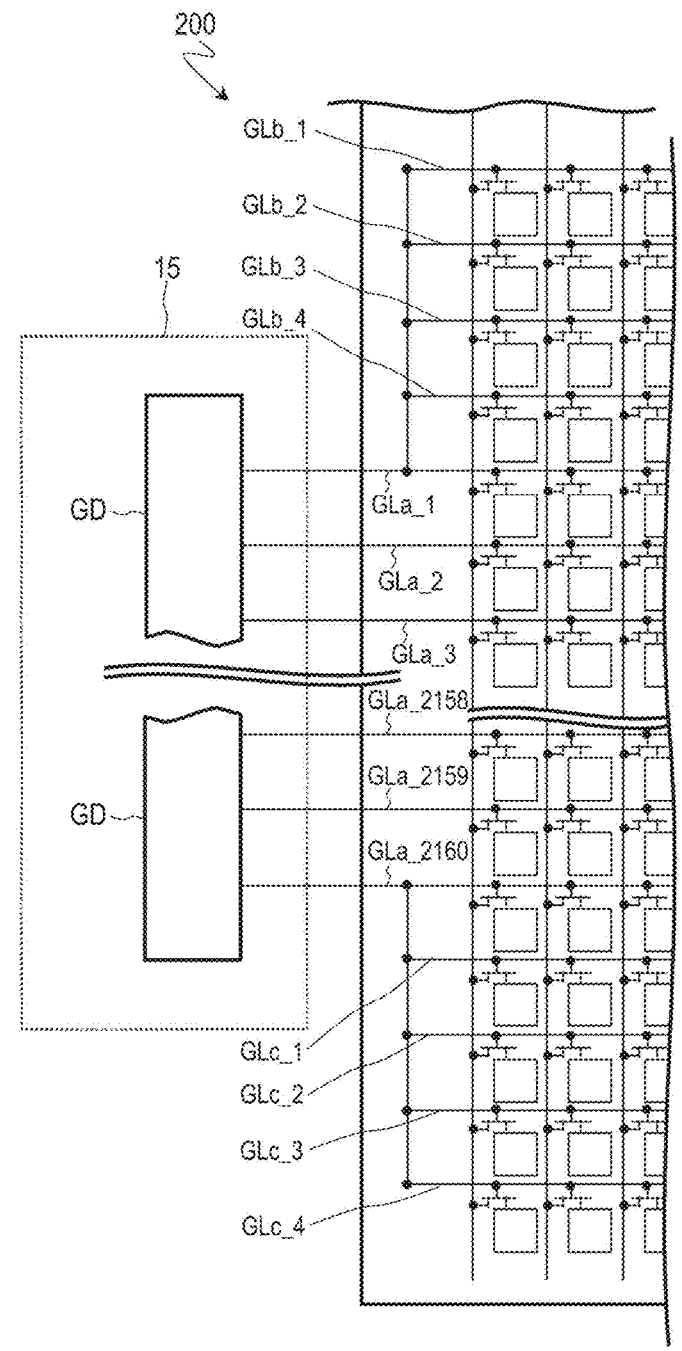
FIG. 8 is a diagram illustrating a gate wiring line drive circuit 15 on a left side of the liquid crystal display device 1000 and the vicinity of the gate wiring line drive circuit 15.

FIG. 8 is a diagram illustrating the gate wiring line drive circuit 15 on the left side and the vicinity of the gate wiring line drive circuit 15. In FIG. 8, a nth first gate wiring line GLa from the upper side among the plurality of first gate wiring lines (normal source wiring lines) GLa is referred to as "GLa_n". Further, a nth second gate wiring line GLb from the upper side among the plurality of second gate wiring lines (additional gate wiring lines) GLb is referred to as "GLb_n" and a nth third gate wiring line GLc from the upper side among the plurality of third gate wiring lines (additional gate wiring lines) GLc is referred to as "GLc_n". In FIG. 8, the 1st to 3rd and 2158th to 2160th first gate wiring lines (normal gate wiring lines) GLa_1 to GLa_3 and GLa_2158 to GLa_2160, and the 1st to 4th second gate wiring lines (additional gate wiring lines) GLb_1 to GLb_4 and the 1st to 4th third gate wiring lines (additional gate wiring lines) GLc_1 to GLc_4 are illustrated.

The four second gate wiring lines GLb_1 to GLb_4 provided in the upper side additional region (third portion) CR2c are electrically connected to the first gate wiring line GLa_1 provided corresponding to the first endmost pixel row (pixel row adjacent to the upper side additional region CR2c). Further, the four third gate wiring lines GLc_1 to GLc_4 provided in the lower side additional region (fourth portion) CR2d are electrically connected to the first gate wiring line GLa_2160 provided corresponding to the second endmost pixel row (pixel row adjacent to the lower side additional region CR2d).

By connecting the additional source wiring lines (second source wiring lines) SLb and the additional gate wiring lines (second gate wiring lines and third gate wiring lines) GLb and GLc as described above, the plurality of additional pixels AP are lit as follows.

Among the plurality of additional pixels AP, each additional pixel (first additional pixel) AP located in the left side additional region CR2a exhibits substantially the same luminance as a pixel P in the same row of the first endmost pixel column (pixel column adjacent to the left side additional region CR2a), and each additional pixel (second additional pixel) AP located in the right side additional region CR2b exhibits substantially the same luminance as a pixel P in the same row of the second endmost pixel column (pixel column adjacent to the right side additional region CR2b).

Further, each additional pixel (third additional pixel) AP located in the upper side additional region CR2c exhibits substantially the same luminance as a pixel P in the same column of the first endmost pixel row (pixel row adjacent to the upper side additional region CR2c), and each additional pixel (fourth additional pixel) AP located in the lower side additional region CR2d exhibits substantially the same luminance as a pixel P in the same column of the second endmost pixel row (pixel row adjacent to the lower side additional region CR2d).

As described above, in the liquid crystal display device 1000 according to the embodiment of the disclosure, source output is performed to the additional source wiring lines (second source wiring lines) SLb, from the source output terminals ot (so to speak, the "vacant" source output terminals ot, here red terminals 0001R and 3840R and green terminals 0001G and 3840G) other than the source output terminals ot that perform source output to the normal source wiring lines SLa (in this case, blue terminals 0001B and 3840B) among the source output terminals ot that constitute the terminal sets TsA and TsB corresponding to the endmost pixel columns (first endmost pixel column and second endmost pixel column). Further, the additional gate wiring lines (second gate wiring lines and third gate wiring lines) GLb and GLc are connected to the normal gate wiring lines (first gate wiring lines) GLa corresponding to the endmost pixel rows (first endmost pixel row and second endmost pixel row). Such a configuration eliminates the need to prepare new input signals for the additional pixels AP in the system circuit 10, so it is possible to use peripheral circuits (a timing controller, a gate driver, and a source driver) for an ordinary liquid crystal panel or to eliminate the need to change specifications of the input signal (for example, for 4K resolution, a signal input of 3840×2160 can be used).

In the embodiment, the normal source wiring line (first source wiring line) SLa and the additional source wiring line (second source wiring line) SLb are connected to the respective source output terminals ot and are separated from each other, so there is no adverse effect on the pixels P of the first dimming region CR1. On the other hand, for example, when the additional source wiring lines (second source wiring lines) SLb are branched from the normal source wiring lines (first source wiring lines) SLa_1 and SLa_3840 corresponding to the endmost pixel columns, the wiring load may increase and the normal source wiring lines (first source wiring lines) SLa_1 and SLa_3840 may not be fully charged.

Further, as in the embodiment, when the additional source wiring line (second source wiring line) SLb is connected to the source output terminal ot via the buffer amplifier 17, even when two or more additional source wiring lines (second source wiring lines) SLb are connected to one source output terminal ot, an increase in load of the source driver SD and a decrease in signal level can be prevented. Note that in the above description, the configuration in which the buffer amplifier 17 is provided in the source driver SD is illustrated, but the buffer amplifier 17 may be provided on a printed wiring board on the source side (S-PWB). Since some source drivers and S-PWBs for ordinary liquid crystal panels are provided with buffer amplifiers for use in repairing breakage of the source wiring line SL as described later, the buffer amplifier provided for repairing breakage can be used as the buffer amplifier 17 to be used to connect the additional source wiring line (second source wiring line) SLb (that is, it is not necessary to newly develop a source driver or S-PWB having a buffer amplifier).

Further, in the above description, the liquid crystal display device 1000 that displays in the transverse electrical field mode (more specifically, the FFS mode) is illustrated, but the display mode of the liquid crystal display device 1000 is not limited to the transverse electrical field mode. When displaying in the transverse electrical field mode, an excellent viewing angle characteristic can be obtained.

Example of Connection Wiring Line CL Provided in Rear Panel 200

Referring to FIGS. 9A, 9B, 9C, and 9D, examples of the connection wiring lines (in-panel wiring lines) CL provided in the rear panel 200 will be described.

Figure 9A:
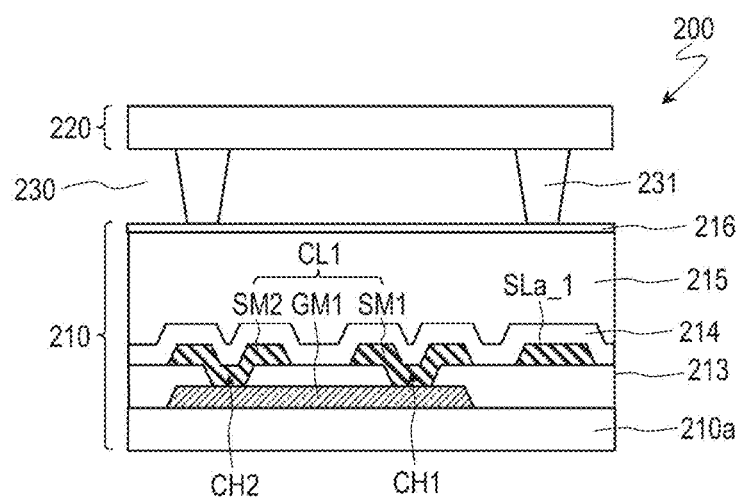
FIG. 9A is a cross-sectional view taken along a line 9A-9A' in FIG. 7A, illustrating a connection wiring line CL1 for electrically connecting a green terminal 0001G and a buffer amplifier 17A.

FIG. 9A is a cross-sectional view taken along a line 9A-9A' in FIG. 7A, illustrating a connection wiring line CL1 for electrically connecting the green terminal 0001G and the buffer amplifier 17A.

The connection wiring line CL1 includes a gate metal portion GM1 formed of the same conductive film as the gate wiring line GL, and source metal portions SM1 and SM2 formed of the same conductive film as the source wiring line SL. The gate metal portion GM1 extends in the row direction, and the source metal portions SM1 and SM2 extend in the column direction.

The gate metal portion GM1 is provided on a substrate (e.g., glass substrate) 210a and is covered with a gate insulating layer 213. The source metal portions SM1 and SM2 are provided on the gate insulating layer 213, and are covered with a first interlayer insulating layer 214. A flattening layer 215 and a second interlayer insulating layer 216 are further layered on the first interlayer insulating layer 214. FIG. 9A also illustrates columnar spacers 231 that define a thickness of the liquid crystal layer 230.

The source signal from the green terminal 0001G is input to the source metal portion SM1. The source metal portion SM2 is responsible for outputting the source signal to the buffer amplifier 17A. The gate metal portion GM1 electrically connects the source metal portion SM1 and the source metal portion SM2. The source metal portions SM1 and SM2 are connected to the gate metal portion GM1 in contact holes CH1 and CH2 formed in the gate insulating layer 213, respectively.

Figure 9B:
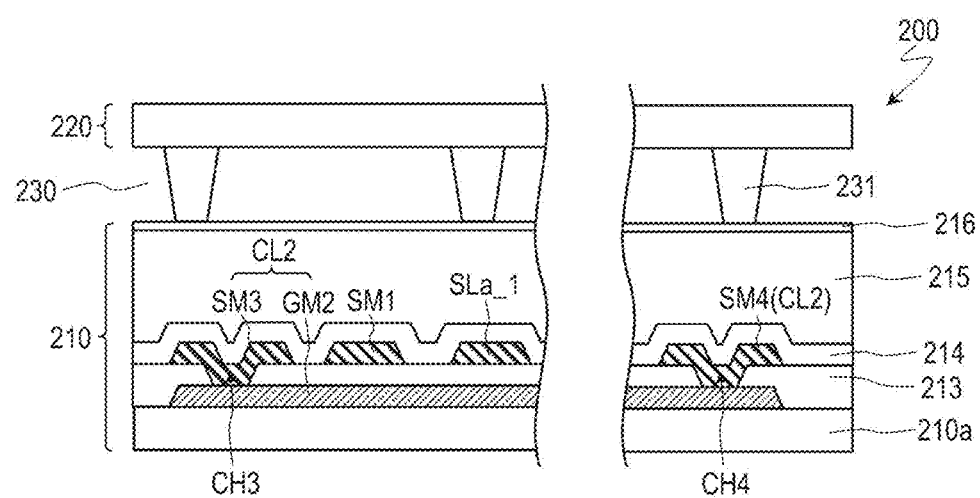
FIG. 9B is a cross-sectional view taken along a line 9B-9B' in FIG. 7A, illustrating a connection wiring line CL2 for electrically connecting a red terminal 0001R and a buffer amplifier 17B.

FIG. 9B is a cross-sectional view taken along a line 9B-9B' in FIG. 7A, illustrating a connection wiring line CL2 for electrically connecting the red terminal 0001R and the buffer amplifier 17B.

The connection wiring line CL2 includes a gate metal portion GM2 and source metal portions SM3 and SM4. The gate metal portion GM2 extends in the row direction, and the source metal portions SM3 and SM4 extend in the column direction.

The source signal from the red terminal 0001R is input to the source metal portion SM3. The source metal portion SM4 is responsible for outputting the source signal to the buffer amplifier 17B. The gate metal portion GM2 electrically connects the source metal portion SM3 and the source metal portion SM4. The source metal portions SM3 and SM4 are connected to the gate metal portion GM2 in contact holes CH3 and CH4 formed in the gate insulating layer 213, respectively.

Figure 9C:
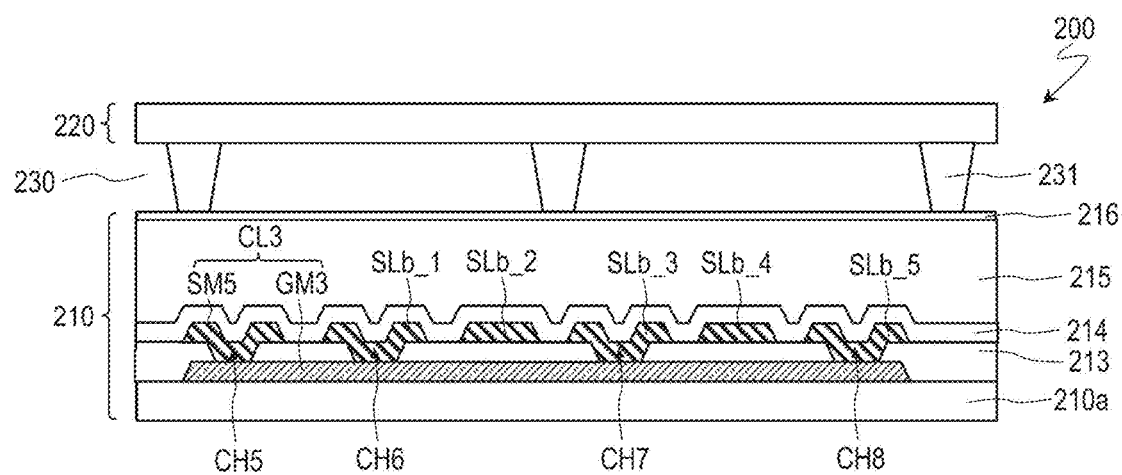
FIG. 9C is a cross-sectional view taken along a line 9C-9C' in FIG. 7A, illustrating a connection wiring line CL3 for electrically connecting the buffer amplifier 17B and second source wiring lines (additional source wiring lines) SLb_1, SLb_3, and SLb_5.

FIG. 9C is a cross-sectional view taken along a line 9C-9C' in FIG. 7A, illustrating a connection wiring line CL3 for electrically connecting the buffer amplifier 17B and the second source wiring lines (additional source wiring lines) SLb_1, SLb_3, and SLb_5.

The connection wiring line CL3 includes a gate metal portion GM3 and a source metal portion SM5. The gate metal portion GM3 extends in the row direction, and the source metal portion SM5 extends in the column direction.

The source signal output from the buffer amplifier 17B is input to the second source wiring lines SLb_1, SLb_3, and SLb_5 via the source metal portion SM5 and the gate metal portion GM3 of the connection wiring line CL3. The source metal portion SM5 is connected to the gate metal portion GM3 in a contact hole CH5 formed in the gate insulating layer 213. The second source wiring lines SLb_1, SLb_3, and SLb_5 are connected to the gate metal portion GM3 in contact holes CH6, CH7, and CH8 formed in the gate insulating layer 213, respectively.

Figure 9D:
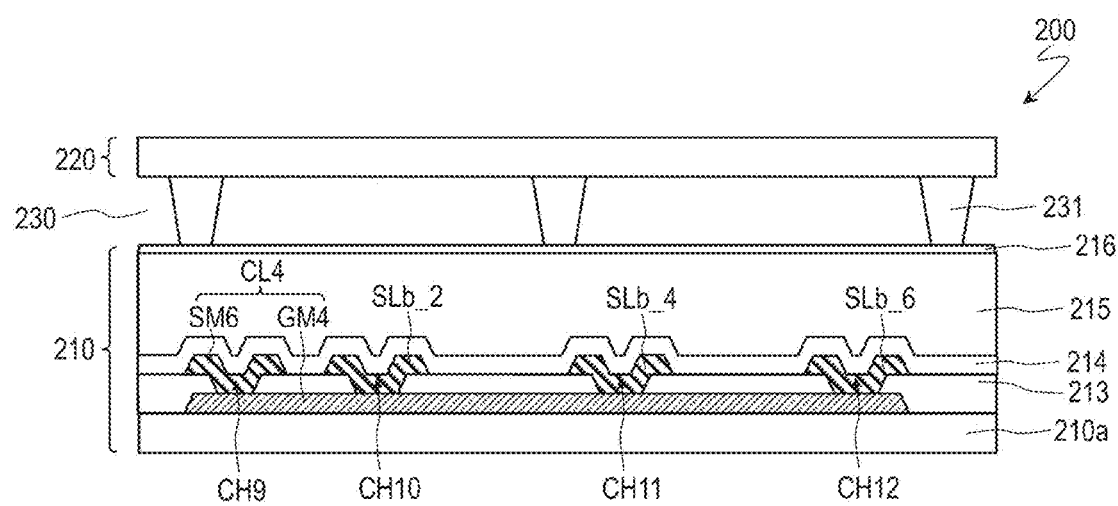
FIG. 9D is a cross-sectional view taken along a line 9D-9D' in FIG. 7A, illustrating a connection wiring line CL4 for electrically connecting the buffer amplifier 17A and second source wiring lines (additional source wiring lines) SLb_2, SLb_4, and SLb_6.

FIG. 9D is a cross-sectional view taken along a line 9D-9D' in FIG. 7A, illustrating a connection wiring line CL4 for electrically connecting the buffer amplifier 17A and the second source wiring lines (additional source wiring lines) SLb_2, SLb_4, and SLb_6.

The connection wiring line CL4 includes a gate metal portion GM4 and a source metal portion SM6. The gate metal portion GM4 extends in the row direction, and the source metal portion SM6 extends in the column direction.

The source signal output from the buffer amplifier 17A is input to the second source wiring lines SLb_2, SLb_4, and SLb_6 via the source metal portion SM6 and the gate metal portion GM4 of the connection wiring line CL4. The source metal portion SM6 is connected to the gate metal portion GM4 in a contact hole CH9 formed in the gate insulating layer 213. The second source wiring lines SLb_2, SLb_4, and SLb_6 are connected to the gate metal portion GM4 in contact holes CH10, CH11, and CH12 formed in the gate insulating layer 213.

Number of Additional Pixel Columns and Additional Pixel Rows

FIG. 5 and the like illustrate an example in which the additional pixels AP are arranged in a plurality of rows and a plurality of columns in the second dimming region (additional dimming region) CR2, but the arrangement of the additional pixels AP is not limited to this example. For example, the additional pixels AP may be arranged in one column in each of the left side additional region CR2a and the right side additional region CR2b. In that case, each of the first endmost terminal set TsA and the second endmost terminal set TsB includes one first source output terminal ot1, one second source output terminal ot2, and one third source output terminal ot3. Further, the additional pixels AP may be arranged in one row in each of the upper side additional region CR2c and the lower side additional region CR2d.

The preferred numbers of additional pixel columns and additional pixel rows in the second dimming region CR2 can be calculated, for example, as follows.

Figure 10A:
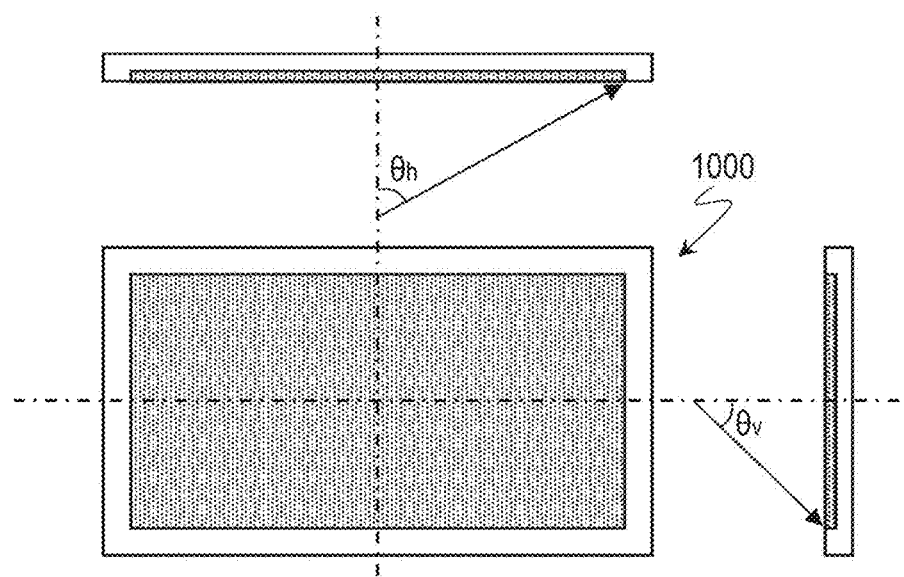
FIG. 10A is a diagram for explaining a horizontal visual angle $\theta_h$ and a vertical visual angle $\theta_v$.

The preferred numbers of additional pixel columns and additional pixel rows depend on a required visual angle (minimum angle required to prevent image lacking), and the module configuration (screen size, resolution, thickness, etc.). In the following description, a visual angle $\theta_h$ in the right-left direction (horizontal direction) is referred to as a "horizontal visual angle", and a visual angle $\theta_v$ in the up-down direction (vertical direction) is referred to as a "vertical visual angle", as illustrated in FIG. 10A. Table 1 below shows the conditions of the trial calculation. As can be seen from Table 1, here, a calculation example is shown when the horizontal visual angle $\theta_h$ is 50° and the vertical visual angle $\theta_v$ is 35°.

TABLE 1

| | Trial calculation condition |
|---|---|
| Screen size | 31.52 inch |
| Display region size | 697.7 mm × 392.5 mm |
| Rear panel (normal dimming region) resolution | 3840 × 2160 |
| Rear panel pixel pitch p | 0.18170 mm |
| Horizontal visual angle $\theta_h$ | 50° |
| Vertical visual angle $\theta_v$ | 35.0° |
| Gap G between TFT substrates | 14 9 mm |
| Panel bonding accuracy A | 0.1 mm |

Figure 10B:
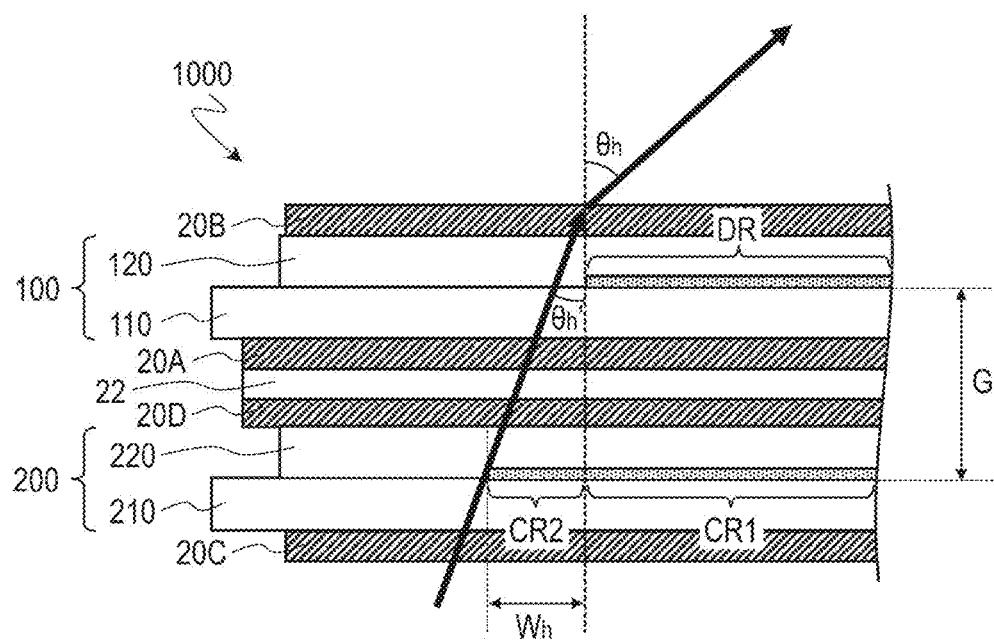
FIG. 10B is a diagram for explaining a relationship between the horizontal view angle $\theta_h$ and a horizontal visual angle $\theta_h'$ in the liquid crystal display device 1000.

FIG. 10B schematically illustrates how light reaching an observer viewing the edge of the display region DR in the horizontal direction at the horizontal visual angle $\theta_h$ travels from the inside of the liquid crystal display device 1000 toward the observer side. The example illustrated in FIG. 10B illustrates a pair of polarizers 20A and 20B arranged so as to sandwich the front panel 100 and a pair of polarizers 20C and 20D arranged so as to sandwich the rear panel 200. The front panel 100 and the rear panel 200 are bonded to each other by an optical clear adhesive (OCA) 22 provided therebetween (more specifically, between the polarizer 20D located on the front face side of the rear panel 200 and the polarizer 20A located on the back face side of the front panel 100).

As can also be seen from FIG. 10B, the horizontal visual angle $\theta_h$ and a horizontal visual angle $\theta_h'$ in the liquid crystal display device 1000 are expressed by the following equation (1) from Snell's law.

$$n_A \sin \theta_h = n_g \sin \theta_h' \qquad (1)$$

In the equation (1), $n_A$ is the refractive index of air and $n_g$ is the refractive index of the substrate glass. When the refractive index of the air is 1 and the refractive index of the substrate glass is 1.52, the horizontal visual angle $\theta_h'$ in the liquid crystal display device 1000 is calculated to be 30.3° from the equation (1).

On the other hand, when a gap between the TFT substrate 110 and the TFT substrate 210 is G and the bonding accuracy between the front panel 100 and the rear panel 200 is A, a width Wh in the horizontal direction (row direction) of each of the left side additional region CR2a and the right side additional region CR2b is expressed by the following equation (2).

$$Wh = G \times \tan \theta_h' + A \qquad (2)$$

From the equation (2), the width Wh of each of the left side additional region CR2a and the right side additional region CR2b is calculated to be 0.97 mm. The number Ph of the additional pixel columns to be arranged in each of the left side additional region CR2a and the right side additional region CR2b is calculated by dividing the width Wh of each of the left side additional region CR2a and the right side additional region CR2b by a pixel pitch p (i.e., Wh/p), and calculated as 5.3.

Similarly, a width Wv of each of the upper side additional region CR2c and the lower side additional region CR2d in the vertical direction (column direction) and the number of the additional pixel rows Pv to be arranged in each of the upper side additional region CR2c and the lower side additional region CR2d are calculated as 0.71 mm and 3.9, respectively. The results of the trial calculation are summarized in Table 2 below.

TABLE 2

|  | Result of trial calculation |
|---|---|
| Width Wh in horizontal direction of left side additional region and right side additional region | 0.97 mm |
| Width Wv in vertical direction of upper side additional region and lower side additional region | 0.71 mm |
| The number Ph of additional pixel columns to left side additional region and right side additional region | 5.3 |
| The number Pv of additional pixel rows to upper side additional region and lower side additional region | 3.9 |

From the trial calculation results shown in Table 2, in the configuration illustrated in FIG. 5 and the like, the number of additional pixel columns arranged in each of the left side additional region (first portion) CR2a and the right side additional region (second portion) CR2b is 6, and the number of the additional pixel rows arranged in each of the upper side additional region (third portion) CR2c and the lower side additional region (fourth portion) CR2d is 4.

In this way, the actual number of additional pixel columns and the actual number of additional pixel rows are integer values obtained by rounding up the values of the calculated number of additional pixel columns and the number of additional pixel rows, (i.e., based on the calculation). Hereinafter, the actual number of additional pixel columns and the actual number of additional pixel rows are referred to as "Phr" and "Pvr", respectively. Further, the actual width of each of the left side additional region CR2a and the right side additional region CR2b is obtained by multiplying the actual number of additional pixel columns Phr by the pixel pitch p, denoted "Whr". Similarly, the actual width of each of the upper side additional region CR2c and the lower side additional region CR2d is obtained by multiplying the actual number of additional pixel rows Pvr by the pixel pitch p, denoted "Wvr". Further, in the following, when simply referring to the "number of additional pixel columns" and "number of additional pixel rows", they refer to the actual number of additional pixel columns Phr and the actual number of additional pixel rows Pvr. Similarly, when simply referring to the "width of the left side additional region CR2a (or the right side additional region CR2b)", it refers to the actual width Whr of the left side additional region CR2a (or the right side additional region CR2b), and when simply referring to the "width of the upper side additional region CR2c (or the lower side additional region CR2d)", it refers to the actual width Wvr of the upper side additional region CR2c (or the lower side additional region CR2d).

Figure 10C:
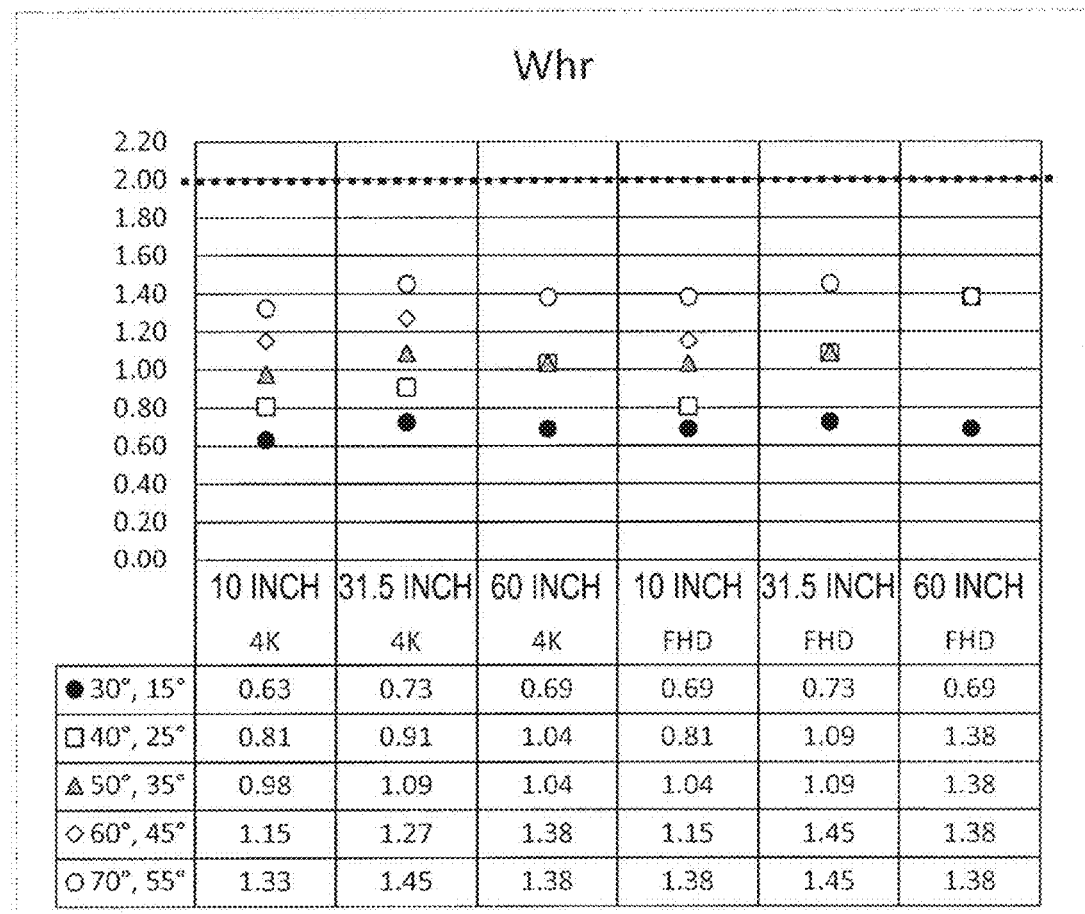
FIG. 10C is a graph showing results of trial calculation of a width Whr in a row direction of each of a left side additional region CR2a and a right side additional region CR2b.
Figure 10D:
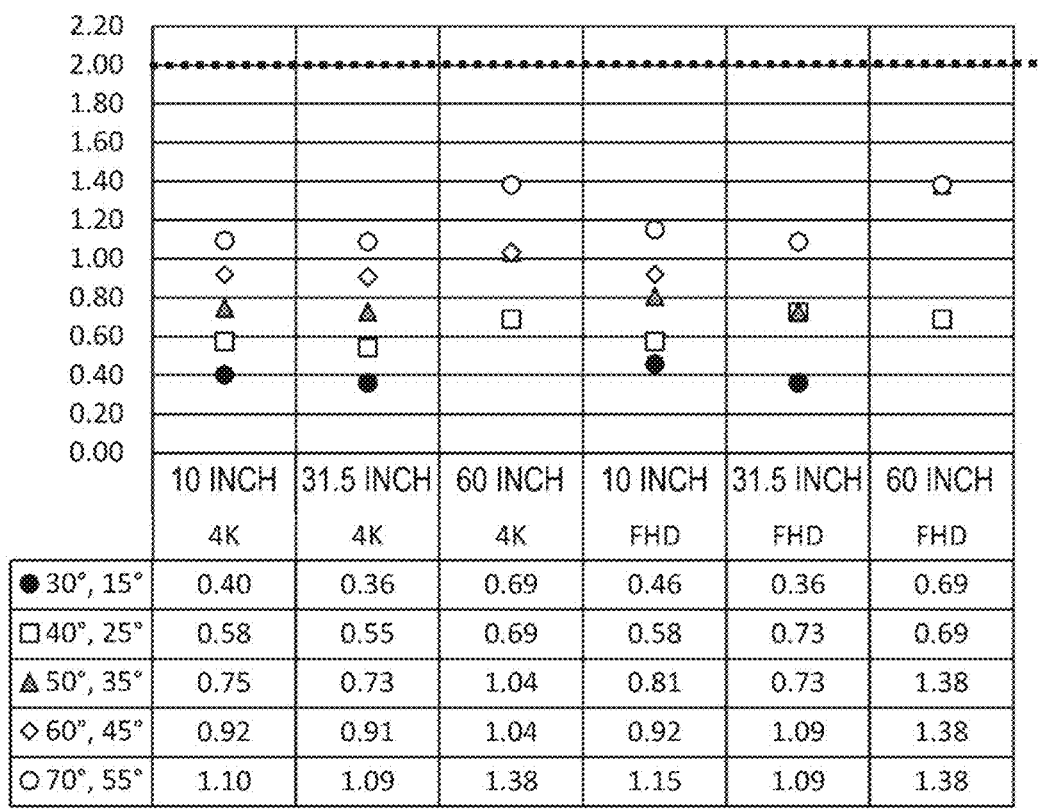
FIG. 10D is a graph showing results of trial calculation of a width Wvr in a column direction of each of an upper side additional region CR2c and a lower side additional region CR2d.

Table 3 and Table 4 below, and FIGS. 10C and 10D show the results of trial calculation of the width Whr of each of the left side additional region CR2a and the right side additional region CR2b and the width Wvr of each of the upper side additional region CR2c and the lower side additional region CR2d by varying the screen size, resolution, horizontal visual angle $\theta_h$, and vertical visual angle $\theta_v$.

TABLE 3

|  | Whr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h$, $\theta_v$ | 30°, 15° | 0.63 | 0.73 | 0.69 | 0.69 | 0.73 | 0.69 |
|  | 40°, 25° | 0.81 | 0.91 | 1.04 | 0.81 | 1.09 | 1.38 |
|  | 50°, 35° | 0.98 | 1.09 | 1.04 | 0.81 | 1.09 | 1.38 |
|  | 60°, 45° | 1.15 | 1.27 | 1.38 | 1.15 | 1.45 | 1.38 |
|  | 70°, 55° | 1.33 | 1.45 | 1.38 | 1.38 | 1.45 | 1.38 |

TABLE 4

|  | Wvr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h$, $\theta_v$ | 30°, 15° | 0.40 | 0.36 | 0.69 | 0.46 | 0.36 | 0.69 |
|  | 40°, 25° | 0.58 | 0.55 | 0.69 | 0.58 | 0.73 | 0.69 |
|  | 50°, 35° | 0.75 | 0.73 | 1.04 | 0.81 | 0.73 | 1.38 |
|  | 60°, 45° | 0.92 | 0.91 | 1.04 | 0.92 | 1.09 | 1.38 |
|  | 70°, 55° | 1.10 | 1.09 | 1.38 | 1.15 | 1.09 | 1.38 |

From Table 3 and FIG. 10C, it can be seen that image lacking can be prevented by setting the width Whr in the row direction of each of the left side additional region CR2a and the right side additional region CR2b to 2 mm or less. Further, from Table 4 and FIG. 10D, it can be seen that image lacking can be prevented by setting the width Wvr in the column direction of each of the upper side additional region CR2c and the lower side additional region CR2d to 2 mm or less.

Figure 10E:
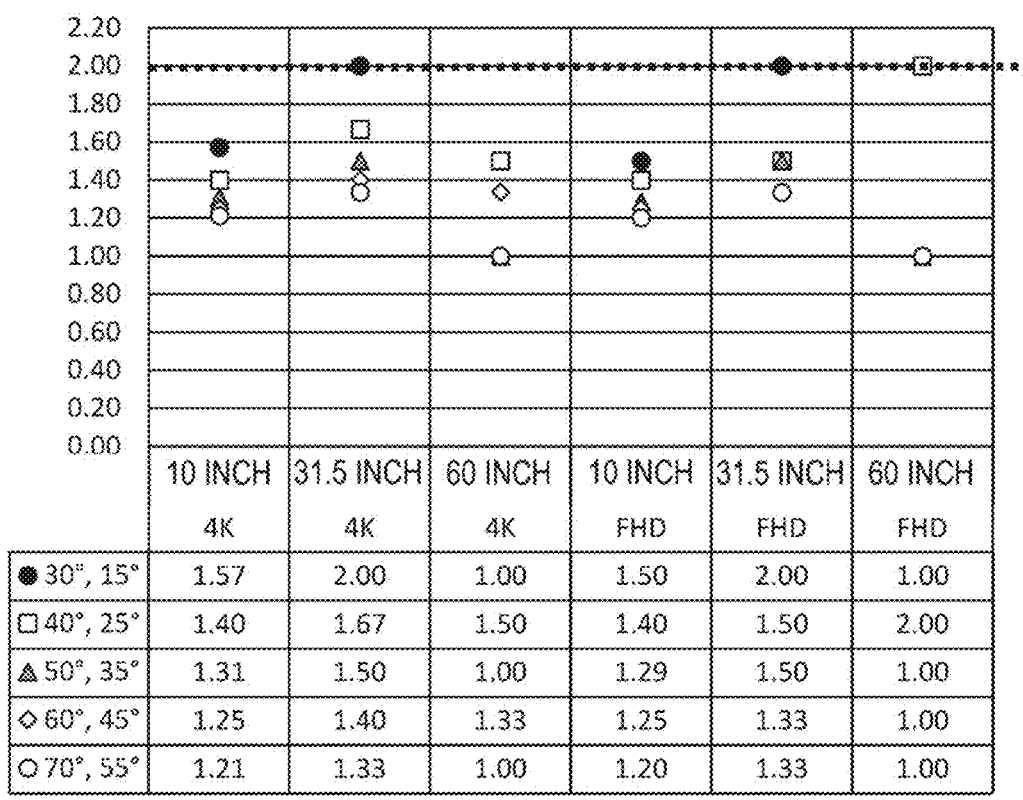
FIG. 10E is a graph showing a ratio Whr/Wvr of the width Whr of each of the left side additional region CR2a and the right side additional region CR2b to the width Wvr of each of the upper side additional region CR2c and the lower side additional region CR2d.

Table 5 below and FIG. 10E show a ratio Whr/Wvr of the width Whr of each of the left side additional region CR2a and the right side additional region CR2b to the width Wvr of each of the upper side additional region CR2c and the lower side additional region CR2d.

TABLE 5

|  | Whr/Wvr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h, \theta_v$ | 30°, 15° | 1.57 | 2.00 | 1.00 | 1.50 | 2.00 | 1.00 |
| | 40°, 25° | 1.40 | 1.67 | 1.50 | 1.40 | 1.50 | 2.00 |
| | 50°, 35° | 1.31 | 1.50 | 1.00 | 1.29 | 1.50 | 1.00 |
| | 60°, 45° | 1.25 | 1.40 | 1.33 | 1.25 | 1.33 | 1.00 |
| | 70°, 55° | 1.21 | 1.33 | 1.00 | 1.20 | 1.33 | 1.00 |

From Table 5 and FIG. 10E, it can be seen that it is preferable that the width Whr of each of the left side additional region CR2a and the right side additional region CR2b in the row direction and the width Wvr of each of the upper side additional region CR2c and the lower side additional region CR2d in the column direction satisfy a relationship of Whr/Wvr≤2.

Figure 10F:
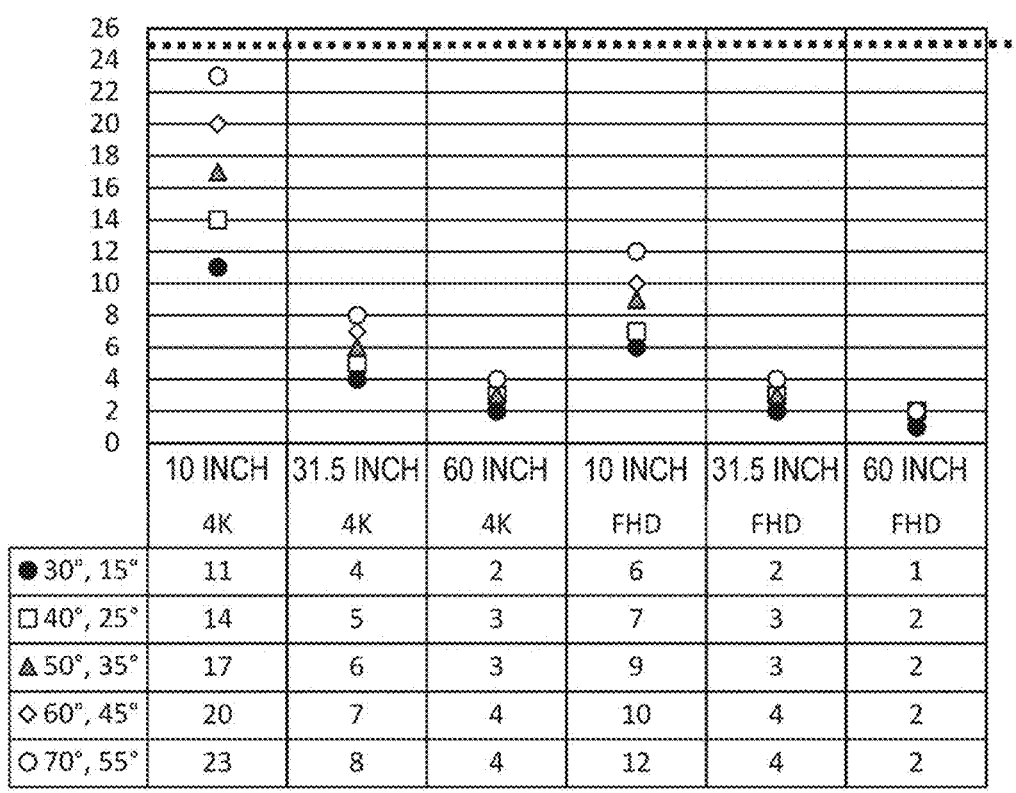
FIG. 10F is a graph showing results of trial calculation of the number Phr of additional pixel columns in each of the left side additional region CR2a and the right side additional region CR2b.

Tables 6 and 7 below, and FIGS. 10F and 10G show the results of trial calculation of the number Phr of the additional pixel columns in each of the left side additional region CR2a and the right side additional region CR2b and the number Pvr of the additional pixel rows in each of the upper side additional region CR2c and the lower side additional region CR2d by varying the screen size, resolution, horizontal visual angle $\theta_h$ and vertical visual angle $\theta_v$.

TABLE 6

|  | Phr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h, \theta_v$ | 30°, 15° | 11 | 4 | 2 | 6 | 2 | 1 |
| | 40°, 25° | 14 | 5 | 3 | 7 | 3 | 2 |
| | 50°, 35° | 17 | 6 | 3 | 9 | 3 | 2 |
| | 60°, 45° | 20 | 7 | 4 | 10 | 4 | 2 |
| | 70°, 55° | 23 | 8 | 4 | 12 | 4 | 2 |

TABLE 7

|  | Pvr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h, \theta_v$ | 30°, 15° | 7 | 2 | 2 | 4 | 1 | 1 |
| | 40°, 25° | 10 | 3 | 2 | 5 | 2 | 1 |
| | 50°, 35° | 13 | 4 | 3 | 7 | 2 | 2 |
| | 60°, 45° | 16 | 5 | 3 | 8 | 3 | 2 |
| | 70°, 55° | 19 | 6 | 4 | 10 | 3 | 2 |

From Table 6 and FIG. 10F, it can be seen that image lacking can be prevented by setting the number Phr of the additional pixel columns in each of the left side additional region CR2a and the right side additional region CR2b to 25 or less. Further, from Table 7 and FIG. 10G, it can be seen that image lacking can be prevented by setting the number of the additional pixel rows Pvr in each of the upper side additional region CR2c and the lower side additional region CR2d to 25 or less.

Figure 10H:
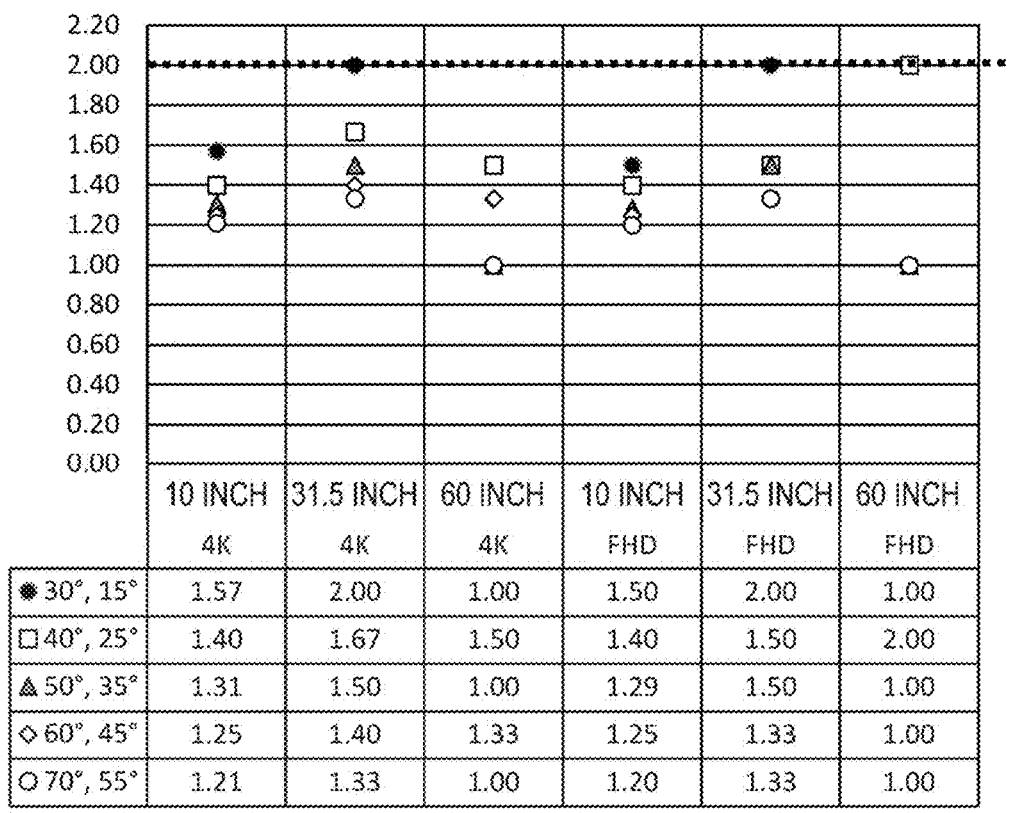
FIG. 10H is a graph showing a ratio Phr/Pvr of the number Phr of the additional pixel columns in each of the left side additional region CR2a and the right side additional region CR2b to the number Pvr of the additional pixel rows in each of the upper side additional region CR2c and the lower side additional region CR2d.

Table 8 below and FIG. 10H show a ratio Phr/Pvr of the number Phr of the additional pixel columns in each of the left side additional region CR2a and the right side additional region CR2b to the number Pvr of the additional pixel rows in each of the upper side additional region CR2c and the lower side additional region CR2d.

TABLE 8

|  | Phr/Pvr | 4K 10 INCH | 4K 31.5 INCH | 4K 60 INCH | FHD 10 INCH | FHD 31.5 INCH | FHD 60 INCH |
|---|---|---|---|---|---|---|---|
| VISUAL ANGLE $\theta_h, \theta_v$ | 30°, 15° | 1.57 | 2.00 | 1.00 | 1.50 | 2.00 | 1.00 |
| | 40°, 25° | 1.40 | 1.67 | 1.50 | 1.40 | 1.50 | 2.00 |
| | 50°, 35° | 1.31 | 1.50 | 1.00 | 1.29 | 1.50 | 1.00 |
| | 60°, 45° | 1.25 | 1.40 | 1.33 | 1.25 | 1.33 | 1.00 |
| | 70°, 55° | 1.21 | 1.33 | 1.00 | 1.20 | 1.33 | 1.00 |

From Table 8 and FIG. 10H, it can be seen that it is preferable that the number Phr of the additional pixel columns in each of the left side additional region CR2a and the right side additional region CR2b and the number Pvr of the additional pixel rows in each of the upper side additional region CR2c and the lower side additional region CR2d satisfy a relationship of Phr/Pvr≤2.

Figure 11A:
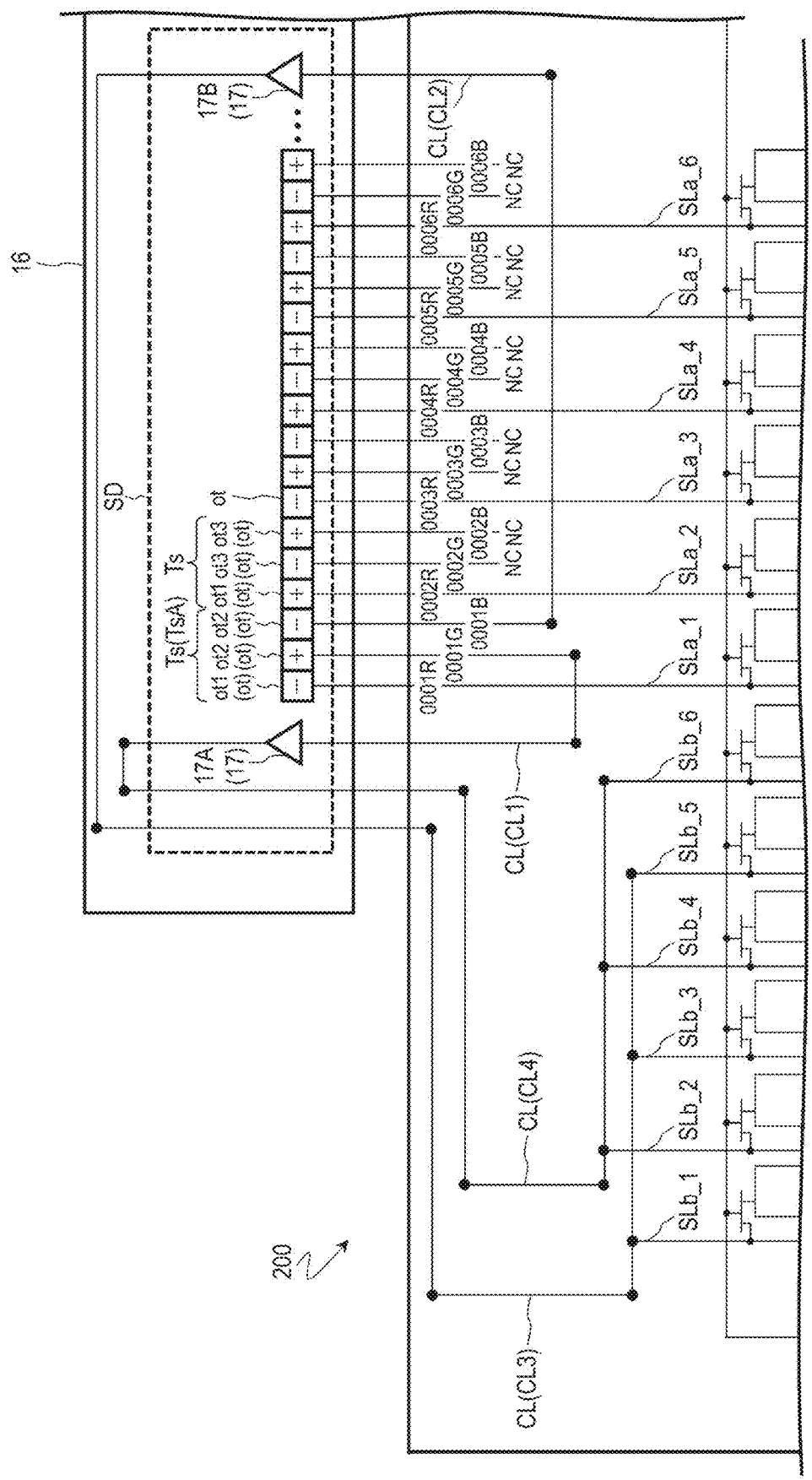
FIG. 11A is a diagram illustrating the leftmost source driver SD among the plurality of source drivers SD of the liquid crystal display device 1000 and the vicinity of the leftmost source driver SD.

Another Connection Example of Source Wiring Line SL and Source Output Terminal ot FIGS. 11A and 11B illustrate another connection example of the source wiring line SL and the source output terminal ot. In the example illustrated in FIGS. 11A and 11B, the red terminal of each terminal set Ts is the first source output terminal ot1, and the red terminal nR of the nth terminal set Ts is electrically connected to the nth first source wiring line (normal source wiring line) SLa_n.

Further, the green terminal 0001G and the blue terminal 0001B of the first endmost terminal set TsA are electrically connected to the second source wiring lines (additional source wiring lines) SLb of the left side additional region CR2a (i.e., the second source output terminal ot2), and the green terminal 3840G and the blue terminal 3840B of the second endmost terminal set TsB are electrically connected to the second source wiring lines (the additional source wiring lines) SLb of the right side additional region CR2b (i.e., the second source output terminal ot2).

Among the second source wiring lines SLb provided in the left side additional region CR2a, the first, third, and fifth second source wiring lines SLb_1, SLb_3, and SLb_5 are electrically connected to the blue terminal 0001B of the first endmost terminal set TsA, and the second, fourth, and sixth second source wiring lines SLb_2, SLb_4 and SLb_6 are electrically connected to the green terminal 0001G of the first endmost terminal set TsA.

Among the second source wiring lines SLb provided in the right side additional region CR2b, the 7th, 9th, and 11th second source wiring lines SLb_7, SLb_9, and SLb_11 are electrically connected to the green terminal 3840G of the second endmost terminal set TsB, and the 8th, 10th, 12th second source wiring lines SLb_8, SLb_10, and SLb_12 are electrically connected to the blue terminal 3840B of the second endmost terminal set TsB.

The green terminal and the blue terminal of each terminal set Ts, other than the first endmost terminal set TsA and the second endmost terminal set TsB, are not electrically connected to either the first source wiring line SLa or the second source wiring line SLb (i.e., the third source output terminal ot3).

The configuration illustrated in FIGS. 11A and 11B has the same effects as the configuration illustrated in FIGS. 7A and 7B.

Example of Another Configuration of Gate Wiring Line Drive Circuit 15

Figure 12:
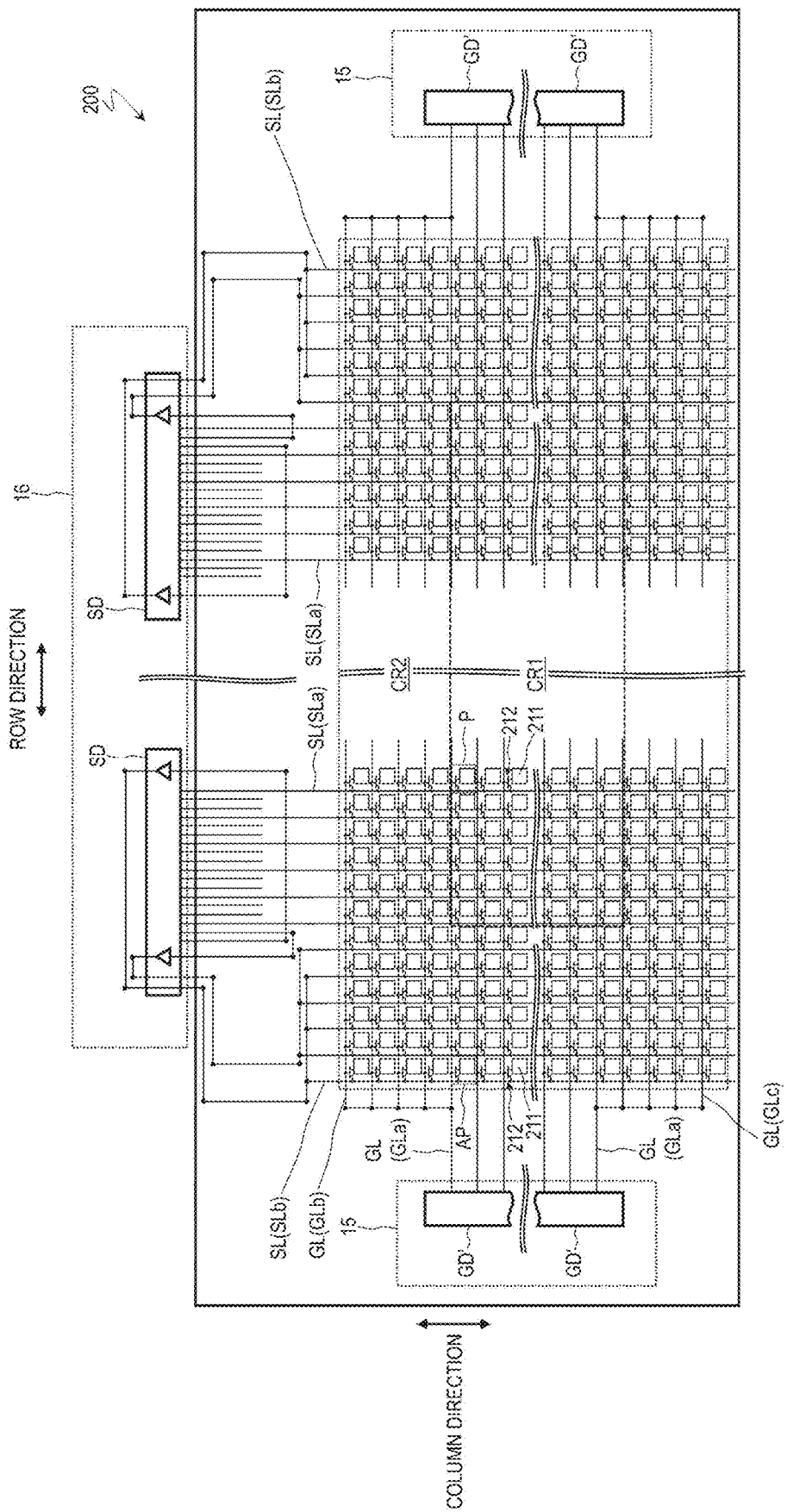
FIG. 12 is a plan view schematically illustrating the rear panel 200.

FIG. 12 illustrates an example of another configuration of the gate wiring line drive circuit 15. In the example illustrated in FIG. 12, a plurality of gate drivers GD' are monolithically (integrally) formed on the TFT substrate 210 of the rear panel 200. The monolithically formed gate driver circuit may be referred to as a gate driver monolithic (GDM) circuit.

The same effects can be obtained in a configuration in which the gate driver GD' is a GDM circuit.

Other Examples of Connection Mode Using Buffer Amplifier 17

Figure 13:
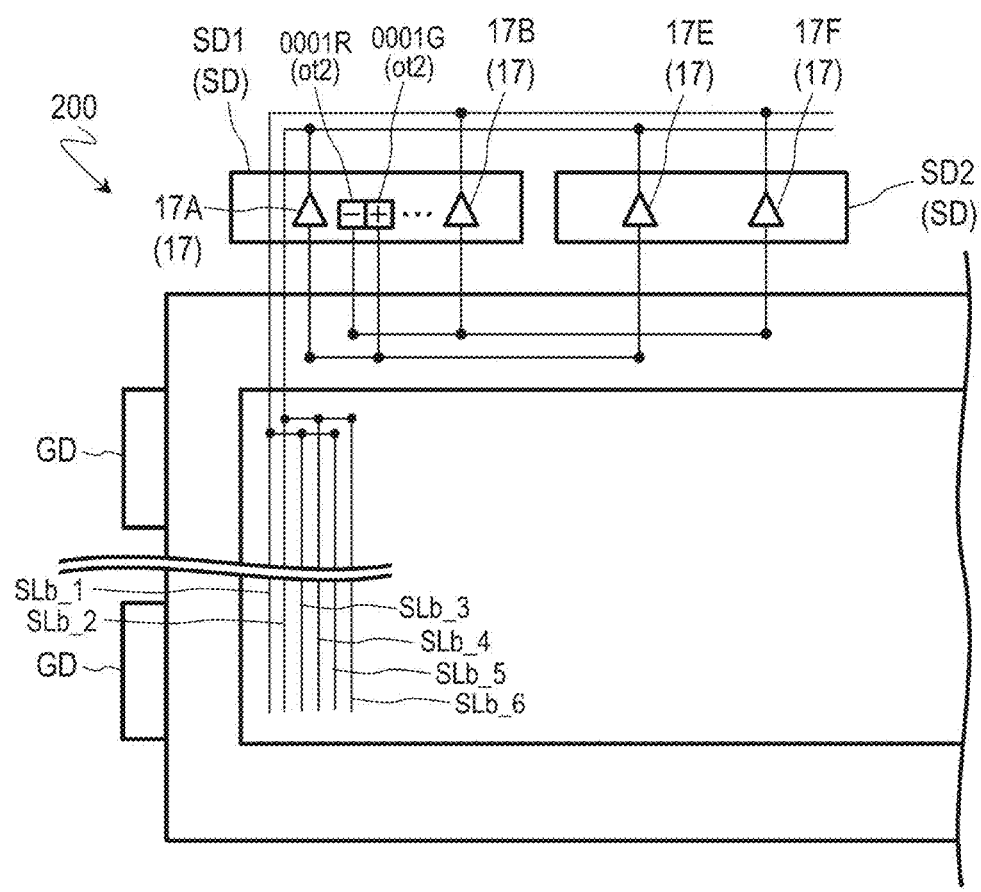
FIG. 13 is a plan view illustrating another example of a connection mode using a buffer amplifier 17.

FIG. 13 illustrates another example of a connection mode using the buffer amplifier 17. FIG. 13 illustrates, among the plurality of source drivers SD, a source driver (hereinafter referred to as "first source driver") SD1 located on the leftmost side, and a source driver (hereinafter referred to as "second source driver") SD2 different from the first source driver SD1 (adjacent to the first source driver SD1). The first source driver SD1 is provided with two buffer amplifiers 17A and 17B, and the second source driver SD2 is also provided with two buffer amplifiers 17E and 17F.

In the example illustrated in FIG. 13, the red terminal 0001R (second source output terminal ot2) is electrically connected to the additional source wiring lines (second source wiring lines) SLb_1, SLb_3, and SLb_5 via the buffer amplifier 17B of the first source driver SD1 and the buffer amplifier 17F of the second source driver SD2 (i.e., via two buffer amplifiers 17). Also, the green terminal 0001G (second source output terminal ot2) is electrically connected to the additional source wiring lines (second source wiring lines) SLb_2, SLb_4, and SLb_6 via the buffer amplifier 17A of the first source driver SD1 and the buffer amplifier 17E of the second source driver SD2 (i.e., via two buffer amplifiers 17).

In this manner, one second source output terminal ot2 is connected to the second source wiring lines SLb via two or more (here two) buffer amplifiers 17, thereby further increasing the signal strength.

Figure 14:
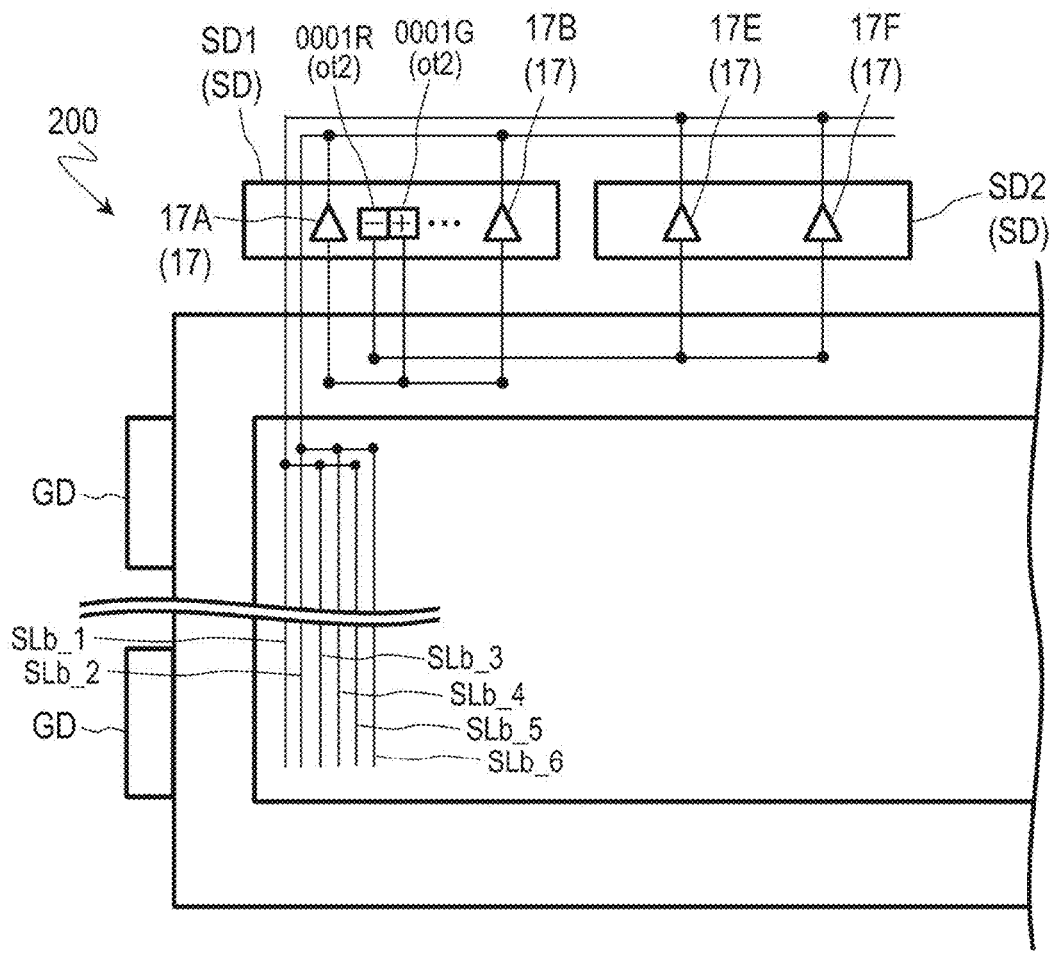
FIG. 14 is a plan view illustrating still another example of a connection mode using the buffer amplifier 17.

FIG. 14 illustrates still another example of a connection mode using the buffer amplifier 17. In the example illustrated in FIG. 14, the red terminal 0001R (second source output terminal ot2) is electrically connected to the additional source wiring lines (second source wiring lines) SLb_1, SLb_3, and SLb_5 via the buffer amplifiers 17E and 17F of the second source driver SD2 (i.e., via two buffer amplifiers 17). Further, the green terminal 0001G (second source output terminal ot2) is electrically connected to the additional source wiring lines (second source wiring lines) SLb_2, SLb_4, and SLb_6 via the buffer amplifiers 17A and 17B of the first source driver SD1 (i.e., via two buffer amplifiers 17).

In the example illustrated in FIG. 14, one second source output terminal ot2 is also connected to the second source wiring lines SLb via two buffer amplifiers 17, thereby further increasing the signal strength.

Figure 15:
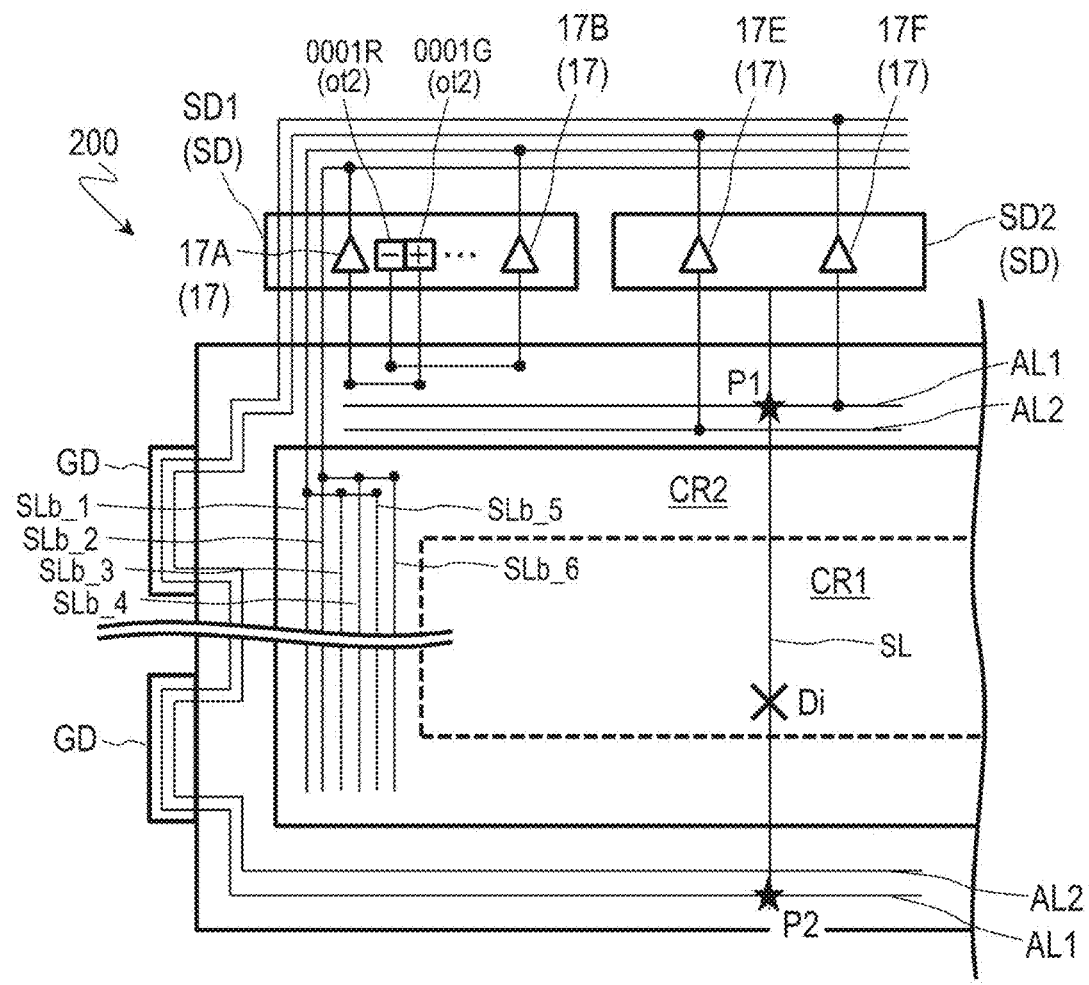
FIG. 15 is a plan view illustrating yet another example of a connection mode using the buffer amplifier 17.

FIG. 15 illustrates yet another example of a connection mode using the buffer amplifier 17. In the example illustrated in FIG. 15, the red terminal 0001R (second source output terminal ot2) is electrically connected to the additional source wiring lines (second source wiring lines) SLb_1, SLb_3, and SLb_5 via the buffer amplifier 17B of the first source driver SD1. The green terminal 0001G (second source output terminal ot2) is electrically connected to the additional source wiring lines (second source wiring lines) SLb_2, SLb_4, and SLb_6 via the buffer amplifier 17A of the first source driver SD1.

Further, in the example illustrated in FIG. 15, spare wiring lines AL1 and AL2 routed outside the second dimming region CR2 are provided. The spare wiring lines AL1 and the AL2 are configured to be electrically connectable to any source wiring line SL.

FIG. 15 illustrates an example in which the spare wiring line AL1 is connected to the source wiring line SL that is broken at a broken point Di. Specifically, a portion of the source wiring line SL upstream of the broken point Di and the spare wiring line AL1 are connected at an intersection P1, and a portion of the source wiring line SL downstream of the broken point Di and the spare wiring line AL1 are connected at an intersection P2. The connection between the source wiring line SL and the spare wiring line AL1 can be performed by, for example, irradiating each of the intersection P1 and the intersection P2 with a laser to melt the source wiring line SL and the spare wiring line AL1.

By connecting the spare wiring line AL1 to the broken source wiring line SL, the source signal can be supplied to the portion of the source wiring line SL downstream of the broken point Di via the spare wiring line AL1. As can be seen from FIG. 15, the supply of the source signal via the spare wiring line AL1 is performed via the buffer amplifier 17F of the second source driver SD2. In contrast, when the spare wiring line AL2 is connected to the broken source wiring line SL, the supply of the source signal via the spare wiring line AL2 is performed via the buffer amplifier 17E of the second source driver SD2.

In this manner, by using some of the plurality of buffer amplifiers 17 to supply the source signals to the additional source wiring lines SLb and using some of the other buffer amplifiers 17 for repairing breakage, both the input of the source signals to the additional pixels AP and the breakage correction of the source wiring line SL can be suitably performed.

Note that, although an example in which two spare wiring lines AL1 and AL2 are provided is illustrated here, the number of spare wiring lines is not limited to two. The number of spare wiring lines is, for example, 5 to 10.

Figure 16:
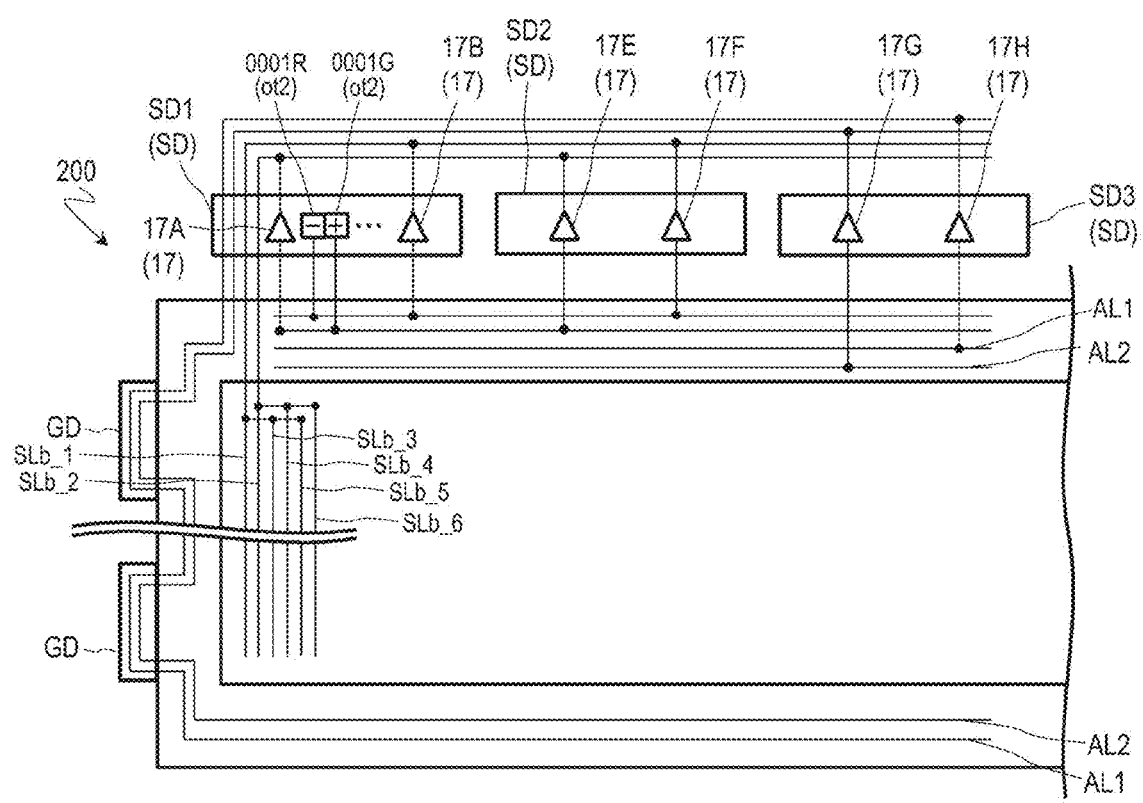
FIG. 16 is a plan view illustrating a further example of a connection mode using the buffer amplifier 17.

FIG. 16 illustrates a further example of a connection mode using the buffer amplifier 17. FIG. 16 illustrates, among the plurality of source drivers SD, the source driver (first source driver) SD1 located on the leftmost side, and two source drivers (second source driver and third source driver) SD2 and SD3, which are different from the first source driver SD1. The first source driver SD1 is provided with two buffer amplifiers 17A and 17B. The second source driver SD2 is also provided with two buffer amplifiers 17E and 17F, and the third source driver SD3 is also provided with two buffer amplifiers 17G and 17H.

In the example illustrated in FIG. 16, the red terminal 0001R (second source output terminal ot2) is electrically connected to the additional source wiring lines (second source wiring lines) SLb_1, SLb_3, and SLb_5 via the buffer amplifier 17B of the first source driver SD1 and the buffer amplifier 17F of the second source driver SD2 (i.e., via two buffer amplifiers 17). Also, the green terminal 0001G (second source output terminal ot2) is electrically connected to the additional source wiring lines (second source wiring lines) SLb_2, SLb_4, and SLb_6 via the buffer amplifier 17A of the first source driver SD1 and the buffer amplifier 17E of the second source driver SD2 (i.e., via two buffer amplifiers 17).

Further, in the example illustrated in FIG. 16, the spare wiring lines AL1 and AL2 routed outside the second dimming region CR2 are provided. The spare wiring lines AL1 and the AL2 are configured to be electrically connectable to any source wiring line SL.

As can be seen from FIG. 16, when the spare wiring line AL1 is used for repairing breakage of the source wiring line SL, the buffer amplifier 17H of the third source driver SD3 is used. Further, when the spare wiring line AL2 is used for repairing breakage of the source wiring line SL, the buffer amplifier 17G of the third source driver SD3 is used. Also in the example illustrated in FIG. 16, both the input of the source signals to the additional pixels AP and the repair of breakage of the source wiring line SL can be suitably performed.

Other Configurations of Second Dimming Region CR2

In the above description, the configuration is illustrated in which the second dimming region (additional dimming region) CR2 has a frame-like shape surrounding the first dimming region CR1, but the embodiment of the disclosure is not limited to this configuration.

Figure 17:
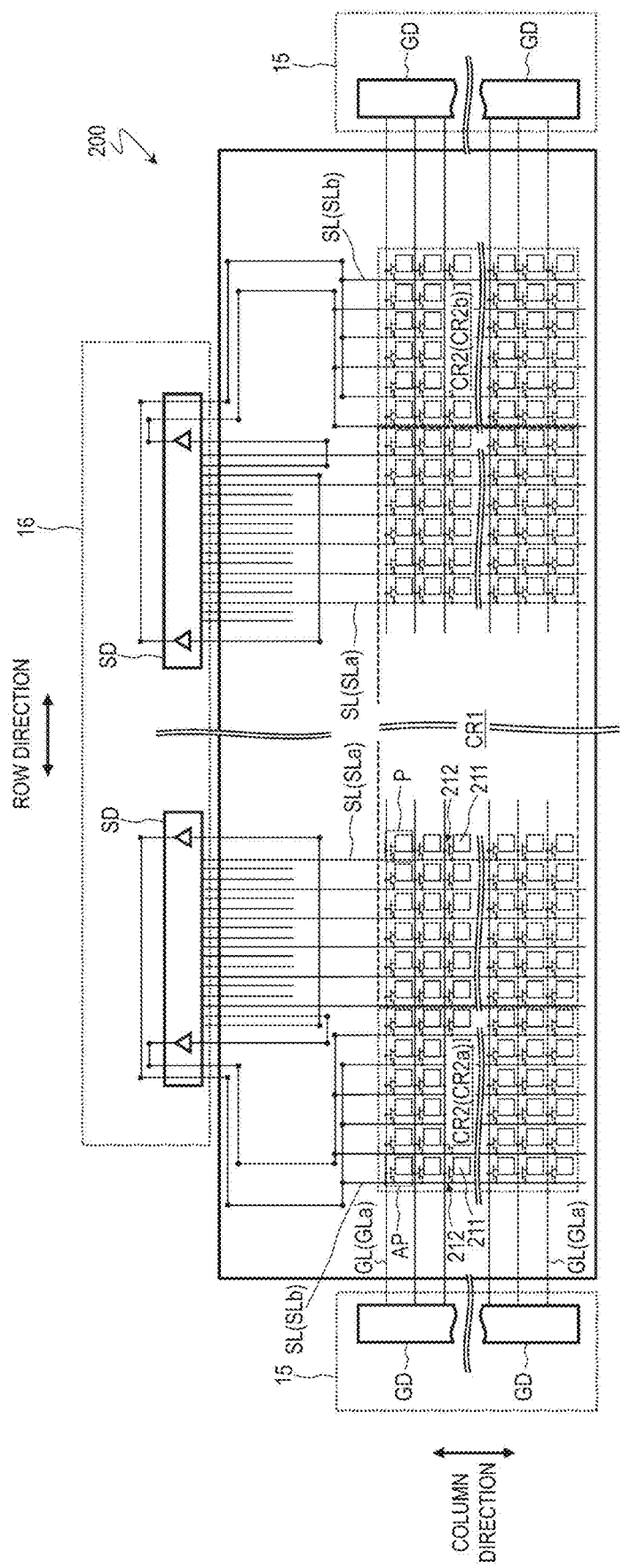
FIG. 17 is a plan view illustrating another example of a configuration of the second dimming region CR2.

FIG. 17 illustrates another example of a configuration of the second dimming region CR2. In the example illustrated in FIG. 17, the second dimming region CR2 includes the left side additional region (first portion) CR2a and the right side additional region (second portion) CR2b, but does not include the upper side additional region (third portion) CR2c and the lower side additional region (fourth portion) CR2d. Further, the plurality of gate wiring lines GL include only the first gate wiring lines (normal gate wiring lines) GLa, and does not include the second gate wiring lines (additional gate wiring lines) GLb and the third gate wiring lines (additional gate wiring lines) GLc. For example, depending on the application of the liquid crystal display device 1000, image lacking in the up-down direction may not be regarded as a problem. In such a case, the configuration illustrated in FIG. 17 may be employed.

Figure 18:
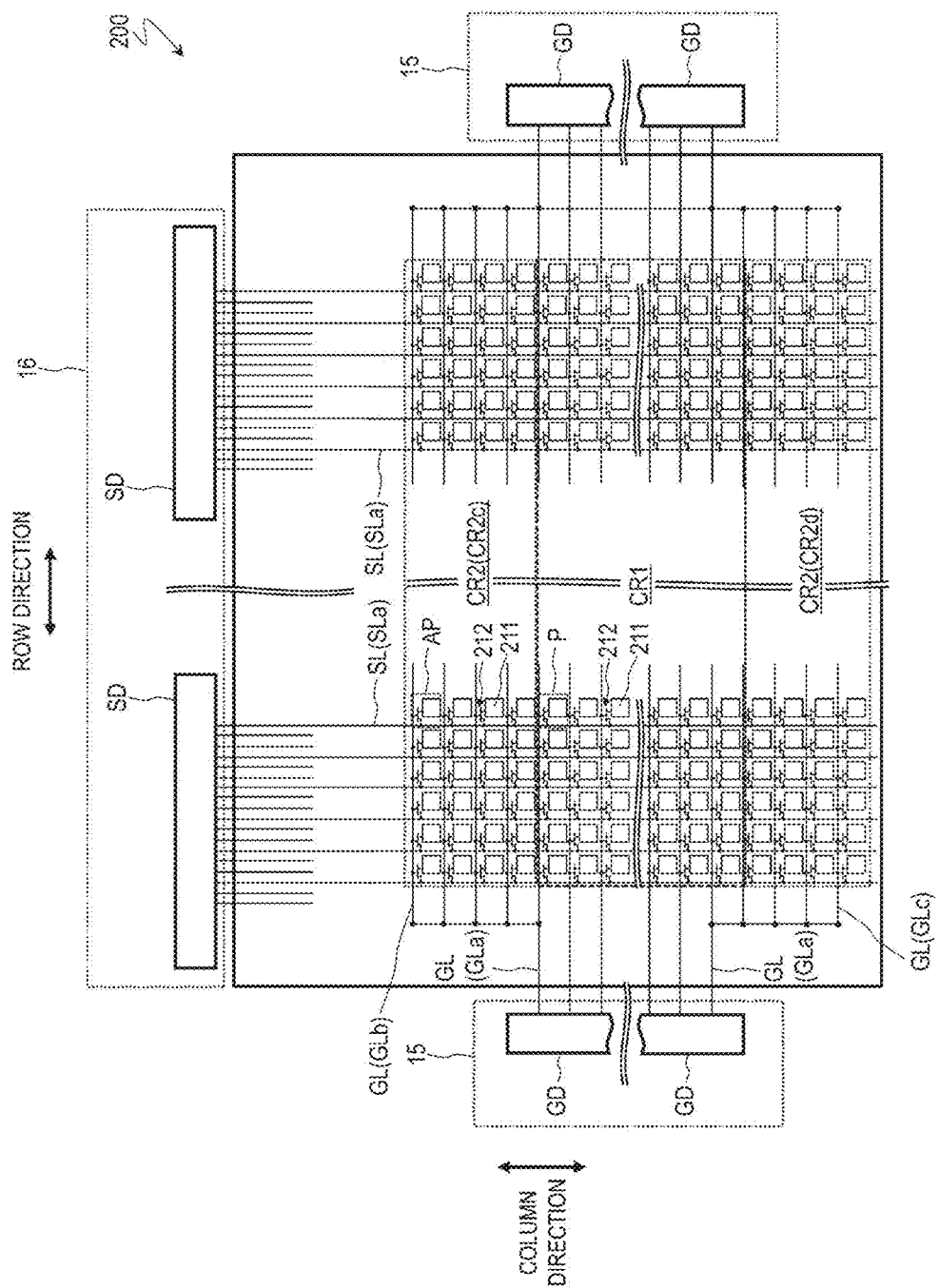
FIG. 18 is a plan view illustrating still another example of a configuration of the second dimming region CR2.

FIG. 18 illustrates still another example of a configuration of the second dimming region CR2. In the example illustrated in FIG. 18, the second dimming region CR2 includes the upper side additional region (third portion) CR2c and the lower side additional region (fourth portion) CR2d, but does not include the left side additional region (first portion) CR2a and the right side additional region (second portion) CR2b. Further, the plurality of source wiring lines SL include only the first source wiring lines (normal source wiring lines) SLa, and does not include the second source wiring lines (additional source wiring lines) SLb. For example, depending on the application of the liquid crystal display device 1000, image lacking in the right-left direction may not be regarded as a problem. In such a case, the configuration illustrated in FIG. 18 may be employed.

As described above, in accordance with the embodiments of the disclosure, there is provided a liquid crystal display device having a dual cell structure that prevents image lacking when observed from an oblique direction.

Note that in the above description, the case in which the resolution of the front panel 100 and the resolution of the first dimming region (normal dimming region) of the rear panel 200 are the same is illustrated, but the embodiments of the disclosure are not limited thereto. For example, the resolution of the first dimming region (normal dimming region) of the rear panel 200 may be lower than the resolution of the front panel 100.

INDUSTRIAL APPLICABILITY

The liquid crystal display device according to the embodiments of the disclosure is suitably used for applications that require display with a high contrast ratio (such as a master monitor).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a first liquid crystal panel including a display region and including a color filter layer;
an illumination device provided on a back face side of the first liquid crystal panel; and
a second liquid crystal panel arranged between the first liquid crystal panel and the illumination device and not including a color filter layers;
wherein the second liquid crystal panel includes:
  a first dimming region defined by a plurality of pixels arranged in a matrix including a plurality of rows and a plurality of columns and facing the display region; and
  a second dimming region defined by a plurality of additional pixels each including an unshaded opening region and located outside the first dimming region;
the second liquid crystal panel includes a plurality of gate wiring lines extending in a row direction and a plurality of source wiring lines extending in a column direction;
the second dimming region includes a first portion and a second portion that extend in the column direction and are arranged sandwiching the first dimming region in the row direction;
the liquid crystal display device further includes a source wiring line drive circuit configured to supply source signals to the plurality of source wiring lines;
the plurality of source wiring lines include a plurality of first source wiring lines provided corresponding to the plurality of pixels and a plurality of second source wiring lines provided corresponding to additional pixels located in the first portion and the second portion of the second dimming region among the plurality of additional pixels;
the source wiring line drive circuit includes a plurality of source output terminals each configured to output a source signal and outnumbering the plurality of source wiring lines; and
the plurality of source output terminals include a plurality of first source output terminals electrically connected to the plurality of first source wiring lines, a plurality of second source output terminals electrically connected to the plurality of second source wiring lines, and a plurality of third source output terminals not electrically connected to either the plurality of first source wiring lines or the plurality of second source wiring lines.

2. The liquid crystal display device according to claim 1, wherein in a case that the number of the plurality of first source wiring lines is n, the number of the plurality of source output terminals is 3n.

3. The liquid crystal display device according to claim 1, wherein the source wiring line drive circuit includes a plurality of terminal sets, each of the plurality of terminal sets including three source output terminals that are arranged consecutively among the plurality of source output terminals and are configured to output source signals having the same gray scale.

4. The liquid crystal display device according to claim 3, wherein one of the three source output terminals is one of the plurality of first source output terminals.

5. The liquid crystal display device according to claim 4, wherein, in a case that, among a plurality of pixel columns configured by the plurality of pixels, a pixel column adjacent to the first portion of the second dimming region is referred to as a first endmost pixel column and a pixel column adjacent to the second portion of the second dimming region is referred to as a second endmost pixel column, and
in a case that, among the plurality of terminal sets, a terminal set including a first source output terminal electrically connected to a first source wiring line provided corresponding to the first endmost pixel column is referred to as a first endmost terminal set and a terminal set including a first source output terminal electrically connected to a first source wiring line provided corresponding to the second endmost pixel column is referred to as a second endmost terminal set,
one or two of the three source output terminals of each of the first endmost terminal set and the second endmost terminal set are the second source output terminal.

6. The liquid crystal display device according to claim 5,
wherein the plurality of source output terminals are arranged such that a source output terminal configured to output a source signal having a first polarity in a horizontal scanning period and a source output terminal configured to output a source signal having a second polarity opposite to the first polarity in the horizontal scanning period are alternately arranged along the row direction, and
the plurality of source wiring lines are electrically connected to some of the plurality of source output terminals such that the second liquid crystal panel is driven by source inversion or dot inversion.

7. The liquid crystal display device according to claim 6,
wherein, among the plurality of additional pixels, the additional pixels located in each of the first portion and second portion are arranged in a plurality of columns,
the plurality of second source wiring lines include two or more second source wiring lines provided in the first portion and two or more second source wiring lines provided in the second portion,
two of the three source output terminals included in each of the first endmost terminal set and the second endmost terminal set are two second source output terminals configured to output source signals having opposite polarities to each other,
some of the two or more second source wiring lines provided in the first portion are electrically connected to one of the two second source output terminals of the first endmost terminal set, and remaining one or more second source wiring lines are electrically connected to another of the two second source output terminals of the first endmost terminal set, and
some of the two or more second source wiring lines provided in the second portion are electrically connected to one of the two second source output terminals of the second endmost terminal set, and remaining one or more second source wiring lines are electrically connected to another of the two second source output terminals of the second endmost terminal set.

8. The liquid crystal display device according to claim 1, further comprising:
a plurality of buffer amplifiers,
wherein each of the plurality of second source output terminals is electrically connected to a corresponding second source wiring line via at least one buffer amplifier among the plurality of buffer amplifiers.

9. The liquid crystal display device according to claim 8, wherein the second liquid crystal panel includes a connection wiring line electrically connecting each of the plurality of second source output terminals to a corresponding second source wiring line via the at least one buffer amplifier.

10. The liquid crystal display device according to claim 1, wherein the plurality of additional pixels include a plurality of first additional pixels located in the first portion of the second dimming region and a plurality of second additional pixels located in the second portion of the second dimming region, in a case that, among a plurality of pixel columns constituted of the plurality of pixels, a pixel column adjacent to the first portion of the second dimming region is referred to as a first endmost pixel column, and a pixel column adjacent to the second portion of the second dimming region is referred to as a second endmost pixel column, each of the plurality of first additional pixels exhibits substantially the same luminance as a pixel in the same row of the first endmost pixel column, and each of the plurality of second additional pixels exhibits substantially the same luminance as a pixel in the same row of the second endmost pixel column.

11. The liquid crystal display device according to claim 1, wherein a width Whr in the row direction of each of the first portion and the second portion of the second dimming region is 2 mm or less.

12. The liquid crystal display device according to claim 1, wherein the number Phr of additional pixel columns in each of the first portion and the second portion of the second dimming region is 25 or less.

13. The liquid crystal display device according to claim 1, wherein the second dimming region includes a third portion and a fourth portion that extend in the row direction and are arranged sandwiching the first dimming region in the column direction.

14. A liquid crystal display device comprising:
a first liquid crystal panel including a display region and including a color filter layer;
an illumination device provided on a back face side of the first liquid crystal panel; and
a second liquid crystal panel arranged between the first liquid crystal panel and the illumination device and not including a color filter layer; wherein
the second liquid crystal panel includes:
  a first dimming region defined by a plurality of pixels arranged in a matrix including a plurality of rows and a plurality of columns and facing the display region, and
  a second dimming region defined by a plurality of additional pixels each including an unshaded opening region and located outside the first dimming region,
the second liquid crystal panel includes a plurality of gate wiring lines extending in a row direction and a plurality of source wiring lines extending in a column direction,
the second dimming region includes a third portion and a fourth portion that extend in the row direction and are arranged sandwiching the first dimming region in the column direction;
the plurality of gate wiring lines include a plurality of first gate wiring lines provided corresponding to the plurality of pixels, at least one second gate wiring line provided corresponding to additional pixels located in the third portion of the second dimming region among the plurality of additional pixels, and at least one third gate wiring line provided corresponding to additional pixels located in the fourth portion of the second dimming region among the plurality of additional pixels;

the at least one second gate wiring line is electrically connected to a first gate wiring line provided corresponding to a pixel row adjacent to the third portion of the second dimming region among the plurality of first gate wiring lines; and the at least one third gate wiring line is electrically connected to a first gate wiring line provided corresponding to a pixel row adjacent to the fourth portion of the second dimming region among the plurality of first gate wiring lines.

15. A liquid crystal display device, comprising:
a first liquid crystal panel including a display region and including a color filter layer;
an illumination device provided on a back face side of the first liquid crystal panel; and
a second liquid crystal panel arranged between the first liquid crystal panel and the illumination device and not including a color filter layer; wherein
the second liquid crystal panel includes:
  a first dimming region defined by a plurality of pixels arranged in a matrix including a plurality of rows and a plurality of columns and facing the display region; and
  a second dimming region defined by a plurality of additional pixels each including an unshaded opening region and located outside the first dimming region;
the second liquid crystal panel includes a plurality of gate wiring lines extending in a row direction and a plurality of source wiring lines extending in a column direction;
the second dimming region includes a third portion and a fourth portion that extend in the row direction and are arranged sandwiching the first dimming region in the column direction;
the plurality of additional pixels include a plurality of third additional pixels located in the third portion of the second dimming region and a plurality of fourth additional pixels located in the fourth portion of the second dimming region;
in a case that, among a plurality of pixel rows constituted of the plurality of pixels, a pixel row adjacent to the third portion of the second dimming region is referred to as a first endmost pixel row, and a pixel row adjacent to the fourth portion of the second dimming region is referred to as a second endmost pixel row;

each of the plurality of third additional pixels exhibits substantially the same luminance as a pixel in the same column of the first endmost pixel row; and each of the plurality of fourth additional pixels exhibits substantially the same luminance as a pixel in the same column of the second endmost pixel row.

16. The liquid crystal display device according to claim 13, wherein a width Wvr in the column direction of each of the third portion and the fourth portion of the second dimming region is 2 mm or less.

17. The liquid crystal display device according to claim 13, wherein the number Pvr of additional pixel rows in each of the third portion and the fourth portion of the second dimming region is 25 or less.

18. The liquid crystal display device according to claim 14,
wherein a width Wvr in the column direction of each of the third portion and the fourth portion of the second dimming region is 2 mm or less.

19. The liquid crystal display device according to claim 14,
wherein the number Pvr of additional pixel rows in each of the third portion and the fourth portion of the second dimming region is 25 or less.

20. The liquid crystal display device according to claim 15,
wherein a width Wvr in the column direction of each of the third portion and the fourth portion of the second dimming region is 2 mm or less.

21. The liquid crystal display device according to claim 15,
wherein the number Pvr of additional pixel rows in each of the third portion and the fourth portion of the second dimming region is 25 or less.

* * * * *